(12) United States Patent
McDonnell

(10) Patent No.: US 12,415,132 B2
(45) Date of Patent: Sep. 16, 2025

(54) SYSTEMS AND METHODS FOR PLAYING GOLF

(71) Applicant: Cobra Golf Incorporated, Carlsbad, CA (US)

(72) Inventor: Michael T. McDonnell, Carlsbad, CA (US)

(73) Assignee: Cobra Golf Incorporated, Carlsbad, CA (US)

( * ) Notice: Subject to any disclaimer, the term of this patent is extended or adjusted under 35 U.S.C. 154(b) by 288 days.

(21) Appl. No.: 17/964,656

(22) Filed: Oct. 12, 2022

(65) Prior Publication Data

US 2024/0091646 A1   Mar. 21, 2024

Related U.S. Application Data

(60) Provisional application No. 63/331,363, filed on Apr. 15, 2022.

(51) Int. Cl.
*A63F 13/812*    (2014.01)
*A63F 13/573*    (2014.01)
(Continued)

(52) U.S. Cl.
CPC ............ *A63F 13/573* (2014.09); *A63F 13/65* (2014.09); *A63F 13/812* (2014.09); *H04L 9/50* (2022.05);
(Continued)

(58) Field of Classification Search
None
See application file for complete search history.

(56) References Cited

U.S. PATENT DOCUMENTS

| 8,636,603 B2 | 1/2014 | Rauchholz |
| 8,641,546 B2 | 2/2014 | Rauchholz |

(Continued)

FOREIGN PATENT DOCUMENTS

EP    2803062 B1    6/2017

OTHER PUBLICATIONS

How Realistic is VR Golf? | Oculus Quest 2 Golf+ Review, YouTube video, Golficity, https://www.youtube.com/watch?v=6cPTyuf1mT8, Mar. 7, 2022 (Year: 2022).*

(Continued)

*Primary Examiner* — Damon J Pierce
(74) *Attorney, Agent, or Firm* — Quarles & Brady LLP

(57) ABSTRACT

A method of playing golf in a virtual environment. The method includes the step of providing an online platform that is displayed on a user interface of a user device. The online platform presents a virtual golf course in the virtual environment. The method also includes the step of providing access to a virtual golf club in the virtual golf course that corresponds to a physical golf club. The method further includes receiving performance data captured by a user controller, generating a digital response in the virtual golf course based on the performance data captured by at least one sensor in communication with the user controller, generating a non-fungible token associated with metadata and a digital object based on the performance data captured by at least one sensor in communication with the user controller, and minting the non-fungible token to a blockchain network.

2 Claims, 13 Drawing Sheets

(51) Int. Cl.
 *A63F 13/65* (2014.01)
 *H04L 9/00* (2022.01)
(52) U.S. Cl.
 CPC ... *A63F 2300/8082* (2013.01); *H04L 2209/56* (2013.01)

(56) References Cited

U.S. PATENT DOCUMENTS

| | | |
|---|---|---|
| 8,641,547 B2 | 2/2014 | Rauchholz |
| 8,641,548 B2 | 2/2014 | Rauchholz et al. |
| 9,195,781 B2 | 11/2015 | Savarese et al. |
| 9,427,639 B2 | 8/2016 | Rauchholz et al. |
| 11,135,495 B2 | 10/2021 | Tuxen et al. |
| 2005/0059483 A1* | 3/2005 | Borge ................... A63F 13/833 463/29 |
| 2014/0221118 A1 | 8/2014 | Meadows et al. |
| 2021/0407317 A1* | 12/2021 | Doherty ................ A63B 69/36 |

OTHER PUBLICATIONS

Golf+ video game, WayBack Machine, https://web.archive.org/web/20220216070842/https://www.golfplusvr.com/, Feb. 16, 2022 (Year: 2022).*

* cited by examiner

SYSTEMS AND METHODS FOR PLAYING GOLF

CROSS-REFERENCE TO RELATED APPLICATIONS

This application claims the benefit of priority of U.S. Provisional App. No. 63/331,363, filed on Apr. 15, 2022, which is incorporated by reference in its entirety herein.

BACKGROUND

Golf is a sport played by multiple players who take turns hitting a golf ball on a golf course to reach a hole, with the object being to reach the hole with the least number of hits (also known as "shots"). While golf has grown in popularity, improving, i.e., lowering, the number of shots one takes requires substantial skill and commitment. Golf is typically played on a golf course with 18 holes that comprise a round, and one round of golf may last three (3) hours or more, not including travel time to and from the golf course. Further, golf is weather dependent, and play is often subject to delays or forfeiture due to inclement weather. As the number of golfers continues to grow, new ways of playing golf have been implemented to provide more individuals access to the sport. One such example includes golf simulator systems, which allow users to play golf indoors through interaction with a virtual screen. However, golf simulators can be expensive, require a large amount of space, and may not accurately depict a true round of golf. Therefore, there exists a continuing need for improvement in the sport of golf.

SUMMARY

In accordance with some embodiments of the disclosed subject matter, systems, methods, and media for playing virtual golf and methods using cryptographic tokens, e.g., non-fungible tokens, are provided.

In some aspects, a method of playing golf in a virtual environment is disclosed. The method comprises the step of providing an online platform that is displayed on a user interface of a user device. The online platform presents a virtual golf course in the virtual environment. The method also comprises the step of providing access to a virtual golf club in the virtual golf course that corresponds to a physical golf club. The method further comprises receiving performance data captured by at least one sensor in communication with a user controller, generating a digital response in the virtual golf course based on the performance data, generating a non-fungible token associated with metadata and a digital object based on the performance data, and minting the non-fungible token to a blockchain network.

In some embodiments, the virtual golf course is a 3D virtual golf course.

In some aspects, a method of playing golf in a virtual environment comprises providing a plurality of sensors capable of surveying and mapping a physical golf course and collecting course data of the physical golf course from the plurality of sensors. The method also comprises converting the course data to virtual representations of the physical golf course and providing an online platform that is displayed on a user interface of a user device. The online platform presents a virtual golf course comprising the virtual representation of the physical golf course in the virtual environment. The method further includes collecting ambient data in real-time and receiving performance data captured by at least one sensor in communication with a user controller. The ambient data is used to generate at least one digital condition within the virtual golf course. The method comprises generating a digital response from the performance data that interacts with the at least one digital condition. The method also comprises generating a non-fungible token that is associated with metadata and a digital object based the performance data and the digital response. The method further comprises minting the non-fungible token to a blockchain network.

In some embodiments, the method comprises the step of allowing users access to participate in a competition in the virtual golf course. In some embodiments, the virtual golf course is a 3D virtual golf course.

In some aspects, a method of playing golf on a physical golf course in a 3D virtual environment comprises providing a plurality of sensors capable of surveying and mapping the physical golf course. The method also comprises collecting data of the physical golf course from the plurality of sensors and converting the data to virtual representations of the physical golf course. The method further comprises generating a 3D virtual golf course that comprises the virtual representations of the physical golf course on a system that allows a user to play golf on the 3D virtual golf course in the 3D virtual environment.

In some aspects, a method of building a virtual golf course in a virtual environment comprises providing a platform that is displayed on a user interface of a user device. The platform presents the virtual environment. The method also comprises manufacturing the virtual golf course in the virtual environment. The method further comprises generating a digital asset authenticated by a non-fungible token and storing the non-fungible token in a blockchain network. The digital asset is linked to the virtual golf course.

In some embodiments, the virtual environment is a 3D virtual environment and the virtual golf course is a 3D virtual golf course.

In some aspects, an augmented reality system comprises an augmented reality device that includes a first sensor and a user interface that has a display screen. The augmented reality system also comprises a golf club that includes a second sensor and a golf ball that includes a third sensor. The augmented reality system further comprises an online platform in communication with the augmented reality device, the first sensor, the second sensor, and the third sensor. The online platform presents a virtual golf course within a virtual environment. The first sensor captures a first set of data, the second sensor captures a second set of data, and the third sensor captures a third set of data. The first set of data, the second set of data, and the third set of data are communicated to the online platform. A first digital response, a second digital response, and a third digital response are generated by the respective first set of data, second set of data, and third set of data within the virtual golf course.

In some aspects, a method of playing golf in a virtual environment comprises providing an augmented reality device that includes a first sensor and a user interface that has a display screen. The method also comprises providing a golf club that includes a second sensor and providing a golf ball that includes a third sensor. The method further comprises providing an online platform in communication with the augmented reality device, the first sensor, the second sensor, and the third sensor. The online platform presents a virtual golf course within the virtual environment. The first sensor captures a first set of data, the second sensor captures a second set of data, and the third sensor captures a third set of data. The first set of data, the second set of data, and the third set of data are communicated to the online platform. A first digital response, a second digital response, and a third digital response are generated by the respective first set of data, the second set of data, and the third set of data within the virtual golf course. The first set of data, the second set of data, or the third set of data is stored within metadata associated with a non-fungible token.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
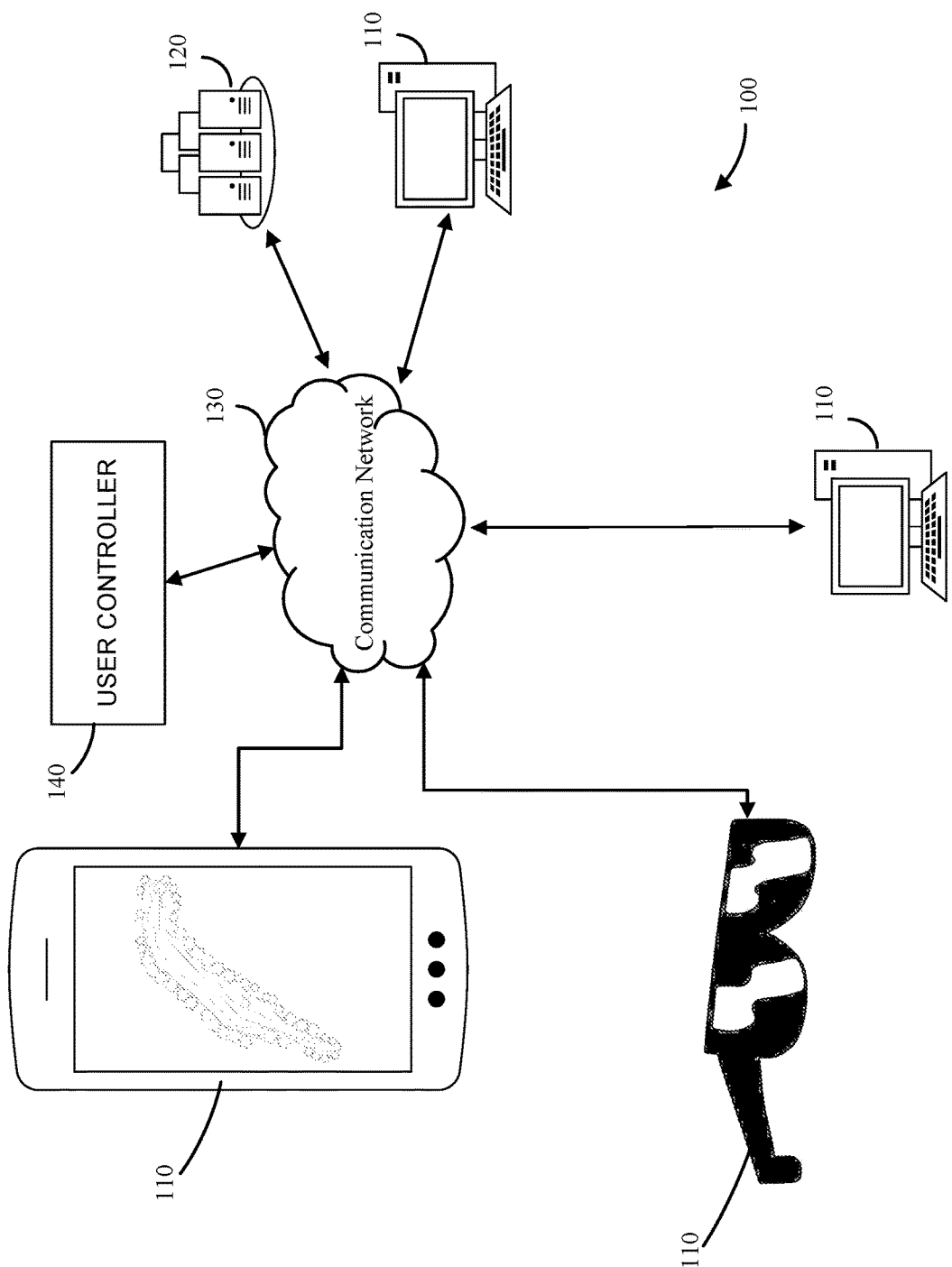
FIG. 1 depicts an example of a system for playing virtual golf in accordance with some embodiments of the disclosed subject matter.

The present application includes embodiments of mechanisms (e.g., systems, methods, and media) for playing virtual golf, building virtual golf courses, and generating digital assets authenticated by cryptographic tokens, e.g., non-fungible tokens (NFTs), which are associated with a virtual golf process, system, or course. In some embodiments, this disclosure relates to playing virtual golf in a 2D or 3D virtual environment. For example, this disclosure relates to playing virtual golf or creating a virtual golf course in the metaverse. In some embodiments, this disclosure relates to cryptographic digital assets for physical articles or objects, such as, e.g., tangible objects, including golf courses, golf holes, golf greens, golf fairways, golf hazards, golf pin locations, and golf course layouts, or the articles or objects may be intangible objects, including graphic designs, virtual golf courses, virtual golf holes, virtual golf greens, virtual golf fairways, virtual golf hazards, virtual golf pin locations, virtual golf course layouts, virtual avatars or characters, graphic user interfaces, or other forms of communication.

Throughout this disclosure, the term "physical" refers to something present in the real world or real-life. In other words, the term "physical" refers to a tangible object or event that exists in the real-life material world. In contrast, throughout this disclosure, the term "virtual" refers to something present in a virtual space or computer. In other words, the term "virtual" refers to an intangible object that exists in a computing device or in the digital realm, e.g., the metaverse would be considered a virtual environment. As noted herein, the term "virtual" can refer to a 2D, 3D, or 4D virtual representation/environment. As further noted herein, the term "virtual" can be interchangeable with the term "digital."

This disclosure relates to playing golf and/or building a virtual golf course in a virtual environment or world, e.g., the metaverse. As noted herein, the term "virtual environment" refers to any environment in or generated by a computing device. In some non-limiting examples, a virtual environment can be a video game, a computer game, a computer, a virtual-reality game or system, a 2D environment, a 3D environment, and/or a 4D environment. Further, the term "metaverse" refers to any virtual-reality space in which users can interact with a computer-generated environment and other users. As used herein, the term "user" is inclusive of a consumer, a purchaser, and a registered or un-registered member or participant in an online platform.

As used herein, a "digital asset" refers to digital files or data for which ownership can be assigned. A digital asset could be a text document, an image file, a video, an audio file, a database file, code blocks, a database, an encryption key, or anything that can be represented digitally, and can be accessed at an addressable location. A digital asset can include any computer-generated virtual object, including digital clubs, club sets, golf courses, golf holes, golf greens, golf hazards, golf tee boxes, golfing gear, avatars, art, collectables, tickets, coins, creatures, or sub-elements thereof, etc., among other virtual objects. Further, the digital asset may be a digital-art version of a tangible, physical object or place, or an object disassociated with tangible, physical objects. For example, the digital asset may be a digital-art version of a physical golf course, golf hole, or golf green having the same or substantially the same appearance. Alternatively, the digital asset may be a digital golf course, golf hole, or golf green generated within the physical realm and without being connected to or representative of physical golf courses, golf holes, or golf greens. Further, the digital asset may become physical through various techniques, such as by manufacturing methods based on aspects of the digital golf course, golf hole, or golf green that are taken as inputs to create the physical golf course, golf hole, or golf green. The digital asset can include metadata which can describe aspects of the digital asset, functions, or properties of the digital asset, and can be formatted in a computer-readable format (e.g., json, xml, yml, html, etc.). A "cryptographic digital asset," as used herein, is a digital asset secured by (e.g., associated with) an NFT minted to a blockchain, or one that has a unique, non-fungible tokenized code ("token") registered on and validated by a blockchain platform or otherwise registered in an immutable database, thus cryptographically securing an interest in the digital asset to the owner of the NFT. An interest can, but need not be, an ownership interest in the cryptographic digital asset, a copyright thereof, a right to use the cryptographic digital asset in a third-party application, or any other interest which can be associated with the cryptographic digital asset.

As used herein, the term "cryptographic token" is a digital unit of value that is stored/recorded on a blockchain. Cryptographic tokens include payment tokens, such as coins (e.g., Bitcoin), utility tokens, security tokens, and non-fungible tokens. As used herein, "non-fungible token" or "NFT" refers to a cryptoasset in the form of a unique, cryptographic token corresponding to a computer-generated virtual object, including digital golf courses, and/or digital articles of apparel. The NFT may be a blockchain-based deed of digital ownership and/or certificate of authenticity. The NFT can be built in accordance with contemporary and relevant standards, such as, e.g., an Ethereum Request for Comments (ERC) 721 (Non-Fungible Token Standard) or ERC1155 (Multi Token Standard) among other relevant standards and as appropriate for the particular blockchain network and applications used therewith. Further, an NFT is built on a "smart contract" that has particular conditions and terms attached to it for dictating various features and transactions associated with the NFT, which can impact the value or, at least, the perceived value of the NFT over time. In essence, the NFT represents authentication of the transaction and serves as a record of this authentication on a blockchain ledger (e.g., Bitcoin, Ethereum, and the like). As such, the NFT itself may fluctuate in value depending on various aspects of the transaction, e.g., the parties involved, value exchanged, time and/or date, exclusivity, or combinations thereof, among other factors. Further, the number and/or frequency of transactions may also cause the NFT to fluctuate in value.

A "smart contract" is generally understood as an agreement that is in the form of a self-enforcing software program that runs on the blockchain network, so it is stored on a public database and is itself immutable. However, the terms within a smart contract, such as one in an NFT, are dictated by one or more of the parties. When creating a smart contract, a party or multiple parties may include programming to allow for negotiation, modification, full or partial acceptance, full or partial refusal, and, ultimately, full or partial enforcement or waiver. It will be appreciated that, as used herein, consideration is merely something of value given in exchange from one party to the other and may be real or personal property, such as, e.g., currency, or may be a return promise, an act, or forbearance. Additionally, options are contracts in which an offeree gives consideration for a promise by the offeror not to revoke an outstanding offer, and options can be provided as part of a larger contract or, alternatively, the option may be the foundation of the contract itself. A smart contract in an NFT may, but need not, be legally enforceable.

As discussed above, the present application discloses methods and systems for playing and building a golf course in the metaverse or a virtual environment. For example, a user may build a virtual golf course or play an existing virtual golf course in the metaverse or other virtual environment. In some embodiments, a user may be provided with a virtual golf club in a virtual golf course that corresponds to a physical golf club. The virtual golf club may act or perform in the same or in a similar fashion as the physical golf club. In some embodiments, physical courses in the real world may be uploaded to a virtual environment or the metaverse for users to play and compete in. For example, Augusta National® Golf Club or Pebble Beach® Golf Club may be uploaded to a virtual environment or the metaverse and played by users therein. Further, as discussed in more detail below, a user may build a virtual golf course in a virtual environment, e.g., the metaverse, and receive a cryptographic digital asset and an associated NFT corresponding to the virtual golf course created. Furthermore, in some embodiments, users may compete in a virtual environment (or the metaverse) against other users or professional golfers in virtual golf, and receive a cryptographic digital asset and associated NFT corresponding to the virtual golf results. For example, while a physical professional or amateur golf competition is taking place in the physical world, the same competition may be performed in a virtual environment or the metaverse concurrently. Therefore, the exact same course and pin placements may be uploaded to the virtual environment or the metaverse and played by users. The virtual course may receive ambient data from the physical course, such as weather conditions, noise conditions, wind speeds, etc., and simulate those conditions in the virtual course. The users can then experience the same conditions that the professionals, for example, are experiencing that day and compete with them or other users in the virtual environment. A cryptographic digital asset, corresponding to results of the user or the conditions played may be generated and provided to the user in response to the competition. In some instances, the results provided in the cryptographic digital asset include a type or model of golf club used for a particular shot. In some instances, a varying number of cryptographic digital assets are generated and provided to the user in response to usage of a particular model or type of golf club. Further, use of a particular model or type of golf club in particular situations, such as in response to particular conditions of the golf course or the competition, may have an impact on the number of cryptographic digital assets. In some instances, an attribute of the cryptographic digital asset is provided in response to the particular golf club type or model.

As briefly outlined above, this disclosure also relates to cryptographic digital assets associated with virtual golf processes and systems, methods for provisioning of such cryptographic digital assets and articles, and decentralized computing systems with attendant blockchain control logic for mining, exchanging, collaborating, modifying, combining, and/or blending blockchain-enabled digital assets and articles. The presently described technology relies on the trust established in and by blockchain technology to enable a company to control the creation, distribution, expression, and use of digital objects that represent their brand. While a digital asset can be publicly available and freely reproducible, an NFT securing the ownership of a digital asset cannot be duplicated on the blockchain. The use of discrete recordation of ownership via blockchain technology can thus provide exclusive digital rights, benefits, and functionalities to an owner, that is not available to another individual or entity that may simply digitally reproduce the digital object or asset. In doing so, the manufacturer has the ability to control or limit the overall supply of the digital objects or traits/aspects thereof and may create a controlled scarcity if so desired. The present disclosure contemplates that, in some examples, the digital asset may be representative of: a physical object or place offered for sale; a 2D or 3D design rendering or design file that may be suitable for future production; a virtual representation of an prototype; or other such objects. Further, some embodiments of the present disclosure include mechanisms for generating cryptographic tokens using virtual reality (VR), augmented reality (AR), and/or graphical user interfaces (GUIs) on computing devices. As noted herein, the cryptographic digital assets and NFTs associated with the virtual golf process and systems described below are similar to the type disclosed in U.S.

Patent Application No. 63/329,785, which is incorporated herein by reference in its entirety.

The present application further discloses mechanisms that bridge the divide between the physical world and the digital realm. For example, according to some embodiments of the present disclosure, individuals may survey and/or map a physical object or place, receive a digital product (e.g., a digital asset) corresponding with the physical object or place, and an NFT may be minted to secure ownership of the digital asset by recording ownership in a blockchain. As another example, users may participate in a virtual golf game and the users may receive an NFT associated with a digital asset that includes metadata based on data collected throughout the game or based on the results of the game. Further, in some embodiments, a user may receive an NFT that is minted to secure a digital asset that includes metadata based on a physical course played at or based on a physical event that the user attended.

By way of example, and not limitation, there are presented cryptographic digital assets and associated NFTs that are provisioned through a blockchain ledger of transaction blocks and function, in part, to connect a real-world product or place, such as a physical golf club, set of clubs, golf course, golf hole, golf green, or round of golf, to a virtual collectable, such as a digital golf club, set of clubs, golf course, golf hole, or golf green. As discussed above, in one example, when a consumer plays a round of golf (virtually or in the physical world), a digital asset including a digital representation of the course or round may be generated, an associated golf or course NFT (e.g., a cryptographic token) can be minted to the blockchain, and the digital representation of the golf course can be linked to the consumer through transfer of the golf or course NFT to the consumer. The digital representation may include a computer-generated avatar of a course or round or a limited-edition artist rendition of the course or round. The digital asset may be authenticated by an encryption-protected block that contains a hash pointer as a link to a related block in a decentralized blockchain, a transaction timestamp, and transaction data. Using the digital asset, the buyer is enabled to trade or sell the digital course or round, store the digital course or round in a cryptocurrency wallet or other digital blockchain wallet, and, based on rules of acceptable golf course, create a custom, golf course.

Further, users can develop a personal user account that is registered with a physical golf course, which is linked to the user's cryptographic wallet and allows the user access to a platform for viewing, purchasing, selling, trading, minting, and burning digital assets and associated cryptographic tokens that may or may not be linked to or representative of tangible goods.

Some embodiments of the present disclosure are directed to computer-generated virtual or digital collectables or assets, such as digital golf courses, or digital golf features (e.g., holes, greens, fairways, hazards, etc.). According to some embodiments, the digital collectables may be secured and/or uniquely identified by a cryptographic token, e.g., an NFT. The digital asset may be linked and/or distributed with real-world, physical products, such as tangible golf courses and/or tangible golf features. The digital assets may be linked or distributed with a 2D or 3D design file such as a computer-aided design (CAD) model, graphical rendering, image, or drawings package from which a physical product may be constructed or otherwise represented.

NFTs can be created, recorded, or "minted" into the blockchain ledger stored in the blockchain network, and thereby stored in memory of one or more of the blockchain nodes. Further, such cryptographic tokens can be destroyed or "burned" by permanent removal from circulation in the blockchain network. Burning can be accomplished in a variety of ways, including by transferring ownership of a cryptographic token to a general, null address that is inaccessible and unowned. Alternatively, burning can effectively be accomplished by modification or destruction of metadata, e.g., a uniform resource locator (URL), included with the cryptographic token. Manufacturers, also referred to herein as brands, courses, or organizations, may burn cryptographic tokens to create scarcity within the marketplace, or to trigger a condition, or as a result of a condition, or for security purposes. For example, a brand or organization may release, e.g., "drop," a collection of digital assets secured or identified by cryptographic tokens, and then may burn any unsold cryptographic tokens within the collection to preserve exclusivity of those sold. In another example, a brand may drop a collection of digital assets secured or identified by NFTs with the condition that purchasers may only have access to their purchased digital asset when all or a particular quantity of the collection has been purchased, which may be expedited by the brand then burning unsold NFTs to meet the condition prematurely. In some embodiments, golf club manufacturers may partner or team up with brands or virtual golf courses in order for golf club manufacturers to offer digital clubs in virtual golf environments or in an NFT produced.

There are several ways a user can be enabled to unlock or acquire a cryptographic asset. In one example, upon completion of playing a virtual round of golf or building a virtual golf course, a unique NFT and corresponding private key are automatically generated and assigned to the user's blockchain wallet. In another example, a private key is provided to the user via a printed or digital receipt, a visual or electronic ID tag (RFID or NFC) hidden in or applied to the physical golf course, a pop-up message or email sent to a personal user account, a push notification or text message sent to a smartphone, or some other record. The consumer uses the private key to link the cryptographic asset to their digital blockchain wallet. In other embodiments, the private key is automatically generated and placed in the user's cryptographic wallet programmatically.

In one non-limiting example, the user may be required to "seek" or "look for" cryptographic assets in golf club houses or stores, i.e., physical stores or virtual stores inside a metaverse or game, by using a photographic capture function or augmented reality ("AR") function on a handheld personal computing device. For this method, a private key may be provided via the validated transaction, however, the user must separately find a hidden cryptographic asset in an AR hidden within the store or local area before the digital asset can be transferred to their wallet, i.e., the cryptographic key and the virtual object must both be separately acquired before the transfer occurs.

In a representative example, an authenticated golf course or hole is created and assigned an identifier, e.g., a georeferenced ID (GRID) or a universal product identifier (UPID). Upon purchase or completion of a round by a consumer (virtually or in the physical world), the identifier may be used to unlock a cryptographic digital asset composed of a collectable digital golf course or hole and associated with a unique non-fungible token (NFT) operating on a blockchain based distributed computing platform. In general, a consumer must have or procure a blockchain wallet address (e.g., an Ethereum hardware wallet) to purchase, unlock, or acquire a cryptographic asset. The blockchain wallet may be used to store a private key belonging to the cryptographic asset and may be linked to a personal account that is registered with the original manufacturer of the physical golf club.

In some instances, the cryptographic asset may not be originally linked to a physical product, but instead may be gifted or sold as part of a brand promotion campaign, event, moment, or experience, e.g., a golf major event. In some instances, the brand (or course) may host or commission a raffle, a game, a contest or other virtual promotion campaigns, events, moments, or experiences for which digital assets may be gifted or sold, or for which NFTs may be generated as proof of attendance or as tickets for entry, among other examples.

FIG. 1 illustrates an example system 100 for playing virtual golf in a virtual environment in accordance with some embodiments of the disclosed subject matter. As shown in FIG. 1, the system may include one or more computing devices or user devices 110, and one or more servers 120. The one or more computing devices 110 can communicate data corresponding to the virtual golf system to the one or more servers 120 over one or more communication networks or connections 130. The one or more computing devices 110 can also communicate data with other computing devices 110 over the one or more communication networks 130. As noted herein, the one or more computing devices or user devices 110 may include smart phones, smart devices, virtual reality headsets, virtual reality glasses, virtual reality computing devices, video game counsels, augmented reality devices, computers, and/or computing devices.

Still referring to FIG. 1, the one or more computing devices 110 can receive data corresponding to the virtual golf system. Additionally, or alternatively, the one or more computing devices 110 can receive input data from a user corresponding to the virtual golf system, i.e., the user may cause a response in the virtual golf course. The one or more computing devices 110 can also execute at least a portion of the system 100 allowing a user to virtually play golf in the virtual golf course. Further, the one or more computing devices 110 can execute at least a portion of the system 100 to generate one or more NFTs corresponding to the virtual golf system.

The one or more servers 120 can also execute at least a portion of the system 100. In such embodiments, the one or more servers 120 can receive data corresponding to a virtual golf system. Additionally, or alternatively, the one or more servers 120 can receive input from a user that corresponds to the virtual golf system, i.e., the server may generate a response in the virtual golf course. Further, the one or more servers 120 can also execute at least a portion of the system 100 to generate one or more NFTs corresponding to the virtual golf system.

Still referring to FIG. 1, the system 100 can also include a user controller 140 that interacts with the one or more computing devices 110, the one or more servers 120, and/or the one or more communication networks 130. The one or more computing devices 110, the one or more servers 120, and the one or more communication networks 130 can receive data or input data from the user controller 140 to impart a response in the virtual environment. For example, the user controller 140 may be a golf club or apparatus/device that the user swings in order to play golf in the virtual environment or metaverse. In some embodiments, the user controller 140 may be another computing device 110, such as, e.g., a virtual reality or augmented reality wearable device, a radar-based motion tracking device, a camera-based motion tracking device, or the like.

Figure 2:
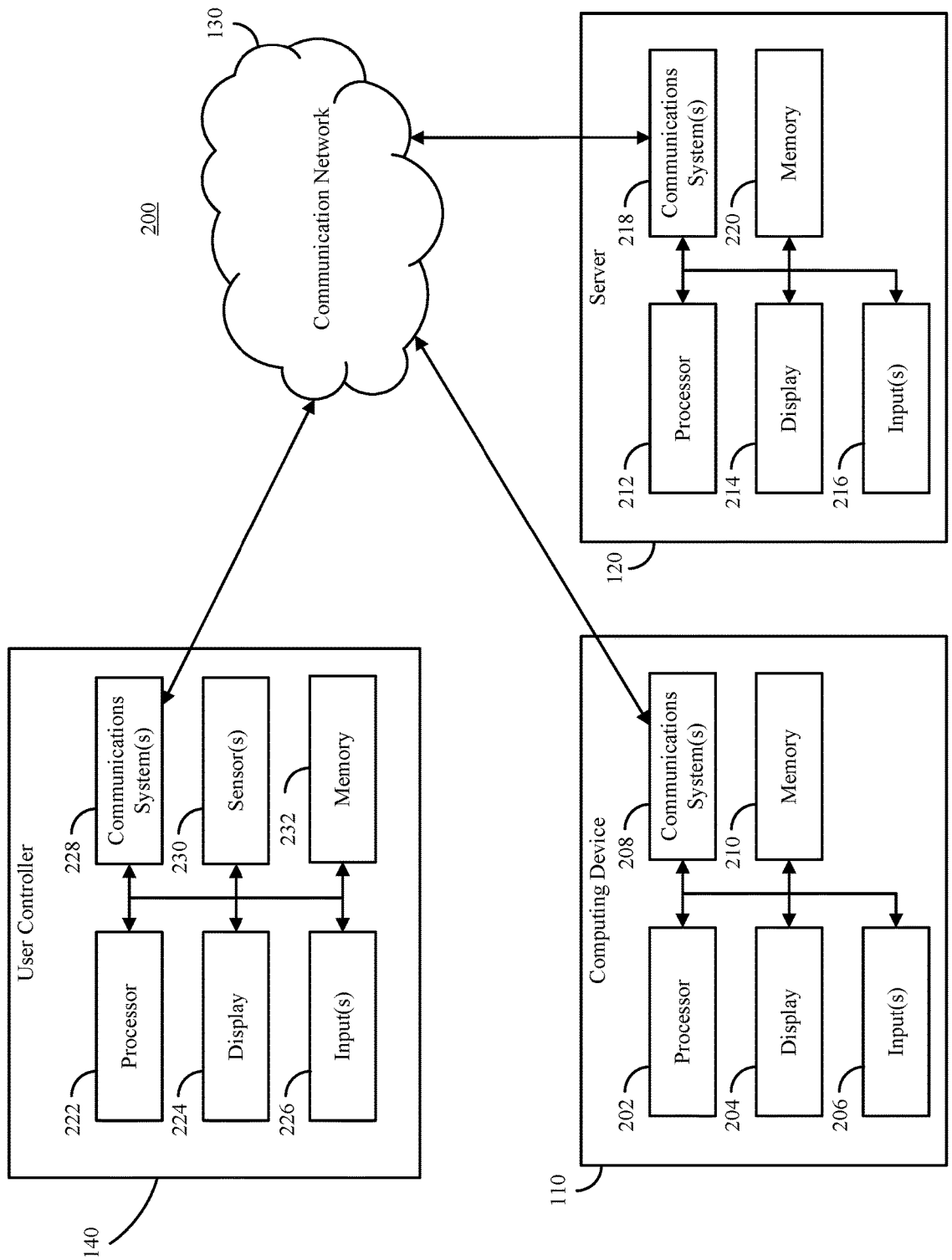
FIG. 2 depicts an example of hardware that can be used to implement a computing device, a server, and a user controller, shown in FIG. 1 in accordance with some embodiments of the disclosed subject matter.

FIG. 2 shows an example of hardware 200 that can be used to implement the computing device 110, server 120, or user controller 140 in accordance with some embodiments of the disclosed subject matter. As shown in FIG. 2, in some embodiments, the computing device 110 can include a processor 202, a display 204, one or more inputs 206, one or more communication systems 208, and/or memory 210. In some embodiments, the processor 202 can be any suitable hardware processor or combination of processors, such as a central processing unit (CPU), a graphics processing unit (GPU), an application specific integrated circuit (ASIC), a field-programmable gate array (FPGA), etc. In some embodiments, the display 204 can include any suitable display devices, such as a computer monitor, a touchscreen, a television, a headset, glasses, etc. In some embodiments, the inputs 206 can include any suitable input devices and/or sensors that can be used to receive user input, such as a keyboard, a mouse, a touchscreen, a joystick, a remote, a microphone, a camera, etc.

In some embodiments, the communications systems 208 can include any suitable hardware, firmware, and/or software for communicating information over the communication network 130 and/or any other suitable communication networks. For example, the communications systems 208 can include one or more transceivers, one or more communication chips and/or chip sets, etc. In a more particular example, the communications systems 208 can include hardware, firmware and/or software that can be used to establish a Wi-Fi connection, a Bluetooth connection, a cellular connection, an Ethernet connection, etc.

In some embodiments, the memory 210 can include any suitable storage device or devices that can be used to store instructions, values, etc., that can be used, for example, by the processor 202 to generate virtual golf courses or a non-fungible token, to present a digital asset using the display 204, to communicate with the server 120 via the communications system(s) 208, etc. The memory 210 can include any suitable volatile memory, non-volatile memory, storage, or any suitable combination thereof. For example, the memory 210 can include random access memory (RAM), read-only memory (ROM), electronically-erasable programmable read-only memory (EEPROM), one or more flash drives, one or more hard disks, one or more solid state drives, one or more optical drives, etc. In some embodiments, the memory 210 can have encoded thereon a computer program for controlling operation of the computing device 110. For example, in such embodiments, the processor 202 can execute at least a portion of the computer program to receive inputs from a graphical user interface for customizing a virtual golf course or playing on a virtual golf course, store in memory the virtual golf course or an image of a digital asset based on the user's customizations or results, generate a non-fungible token based on the digital asset, and mint the non-fungible token to a blockchain network made up of the computing devices 110 and/or the servers 120. As another example, the processor 202 can execute at least a portion of the computer program to implement the system 100 for building a virtual golf course in a virtual environment, playing virtual golf in a virtual environment, and generating an NFT corresponding to a virtual golf course. As yet another example, the processor 202 can execute at least a portion of process 800, 900, 1000, 1100, 1200, 1300 described below in connection with FIGS. 8-13.

In some embodiments, the server 120 can include a processor 212, a display 214, one or more inputs 216, one or more communications systems 218, and/or memory 220. In some embodiments, the processor 212 can be any suitable hardware processor or combination of processors, such as a CPU, a GPU, an ASIC, an FPGA, etc. In some embodiments, the display 214 can include any suitable display device, such as a computer monitor, a touchscreen, a television, etc. In some embodiments, the inputs 216 can include any suitable input devices and/or sensors that can be used to receive user input, such as a keyboard, a mouse, a touchscreen, a joystick, a remote, a microphone, a camera, etc.

In some embodiments, the communications systems 218 can include any suitable hardware, firmware, and/or software for communicating information over the communication network 130 and/or any other suitable communication networks. For example, the communications systems 218 can include one or more transceivers, one or more communication chips and/or chip sets, etc. In a more particular example, the communications systems 218 can include hardware, firmware and/or software that can be used to establish a Wi-Fi connection, a Bluetooth connection, a cellular connection, an Ethernet connection, etc.

In some embodiments, the memory 220 can include any suitable storage device or devices that can be used to store instructions, values, etc., that can be used, for example, by the processor 212 to present content using the display 214, to communicate with the one or more computing devices 110, etc. The memory 220 can include any suitable volatile memory, non-volatile memory, storage, or any suitable combination thereof. For example, the memory 220 can include RAM, ROM, EEPROM, one or more flash drives, one or more hard disks, one or more solid state drives, one or more optical drives, etc. In some embodiments, the memory 220 can have encoded thereon a server program for controlling operation of the server 120. For example, in such embodiments, the processor 212 can execute at least a portion of the server program to receive inputs from a graphical user interface for customizing a virtual golf course or playing on a virtual golf course, store in memory (e.g., the memory 220) the virtual golf course or an image of a digital asset based on the user's customization or results, generate a non-fungible token based on the digital asset, and/or mint the non-fungible token to a blockchain network made up of the computing devices 110 and/or the servers 120. As another example, the processor 212 can execute at least a portion of the server program to implement the system 100 for building a virtual golf course in a virtual environment, playing virtual golf in a virtual environment, and generating a non-fungible token corresponding to a virtual golf course. As yet another example, the processor 212 can execute at least a portion of process 800, 900, 1000, 1100, 1200, 1300 described below in connection with FIGS. 8-13.

Still referring to FIG. 2, in some embodiments, the user controller 140 can include a processor 222, a display 224, one or more inputs 226, one or more communication systems 228, one or more sensors 230, and/or memory 232, as similarly as described above with respect to the computing device 110 and the server 120. As such, in some embodiments, processor 222 can be any suitable hardware processor or combination of processors, such as a central processing unit (CPU), a graphics processing unit (GPU), an application specific integrated circuit (ASIC), a field-programmable gate array (FPGA), etc. In some embodiments, the display 224 can include any suitable display devices, such as a computer monitor, a touchscreen, a television, a headset, glasses, etc. In some embodiments, the inputs 226 can include any suitable input devices and/or sensors that can be used to receive user input, such as a keyboard, a mouse, a touchscreen, a joystick, a remote, a microphone, a camera, a wearable device, etc.

In some embodiments, the communications systems 228 can include any suitable hardware, firmware, and/or software for communicating information over the communication network 130 and/or any other suitable communication networks. For example, the communications systems 228 can include one or more transceivers, one or more communication chips and/or chip sets, etc. In a more particular example, the communications systems 228 can include hardware, firmware and/or software that can be used to establish a Wi-Fi connection, a Bluetooth connection, a cellular connection, an Ethernet connection, etc.

In some embodiments, the memory 232 can include any suitable storage device or devices that can be used to store instructions, values, etc., that can be used, for example, by the processor 222 to generate virtual golf courses or a non-fungible token, to impart a response in the virtual golf course, to present a digital asset using the display 224, to communicate with the server 120 and/or the computing device 110 via the communications system(s) 228, etc. The memory 232 can include any suitable volatile memory, non-volatile memory, storage, or any suitable combination thereof. For example, the memory 232 can include random access memory (RAM), read-only memory (ROM), electronically-erasable programmable read-only memory (EEPROM), one or more flash drives, one or more hard disks, one or more solid state drives, one or more optical drives, etc. In some embodiments, the memory 232 can have encoded thereon a computer program for controlling operation of the user controller 140.

In some embodiments, the one or more sensors 230 of the user controller 140 may send data to the computing device 110 and/or server 120 through the communication system 228. The sensors 230 may comprise any type of sensor known to one of ordinary skill in the art. For example, the one or more sensors 230 can include temperature sensors, proximity sensors, accelerometers, IR sensors, pressure sensors, light sensors, ultrasonic sensors, touch sensors, color sensors, position sensors, magnetic sensors, microphones, tilt sensors, strain and weight sensors, gyroscopes, heartbeat sensors, etc. The user controller 140 may further comprise feedback devices, such as, e.g., an eccentric rotating mass (ERM) actuator or a linear resonant actuator (LRA) or a piezoelectric actuator, for providing kinesthetic communication, including vibration, forces, or other haptics, to mimic the experience and sensations associated with the use of a physical golf club. In this way, the user controller 140 is configured to communicate with the communication system 228 by way of the sensors 230 and configured to communicate with the user by way of the feedback devices, such that the user controller 140 provides the feel and/or performance in the virtual environment that is reflective of the feel and/or performance of the physical golf clubs in the physical environment. In some embodiments, the user controller 140 may not comprise the display 224 and/or the memory 232 therein.

Still referring to FIG. 2, in some embodiments, the processor 222 of the user controller 140 can execute at least a portion of the computer program to receive inputs from a graphical user interface and/or the sensors 230 to impart a response on the computing device 110 and/or the server 120. In some embodiments, the user controller 140 may be used to play virtual golf in a virtual environment on the computing device 110. The user controller 140 can be a swing apparatus or golf club controller that uses the one or more sensors 230 to send data and inputs to the computing device 110 and/or the server 120 through the communication network 130. The processor 222 can send the data from the sensors 230 and inputs 226 to invoke a response in the virtual environment. As yet another example, the processor 222 can execute at least a portion of process 800, 900, 1000, 1100, 1200, 1300 described below in connection with FIGS. 8-13.

Figure 3:
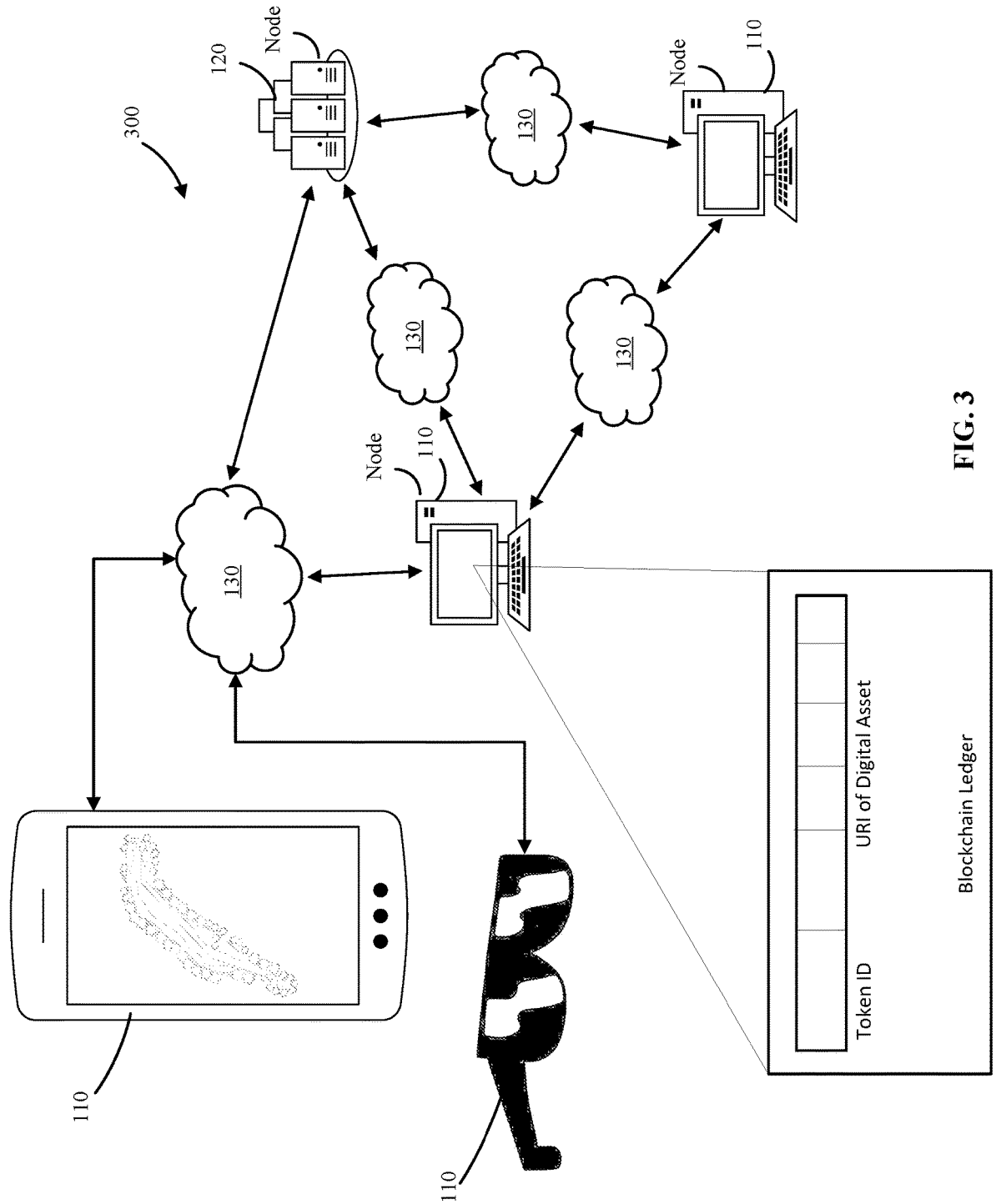
FIG. 3 depicts a schematic representation of an example blockchain network according to some embodiments of the present disclosure.

FIG. 3 illustrates an example blockchain network 300 according to some embodiments of the present disclosure. The blockchain network 300 may include one or more blockchain nodes. The blockchain nodes may each be a computing device 110 (e.g., similar to computing device 110 of FIGS. 1 and 2), or a server 120 (e.g., similar to server 120 of FIGS. 1 and 2) that are in communication with one another (e.g., via a communication network similar to the communication network 130 of FIGS. 1 and 2). Any NFT created from the systems and processes outlined herein may be stored in a blockchain ledger stored on one or more of the blockchain nodes, e.g., "minted" into the blockchain ledger, stored in the blockchain network, and thereby stored in memory of one or more of the blockchain nodes. For example, metadata of the digital asset corresponding to a GolfNFT may be stored in memory on a local computing device, e.g., the computing device 110, and may be copied into the memory of one or more blockchain nodes, e.g., servers, such as the server 120, and/or computing devices that may be similar to the computing device 110). In some embodiments, the metadata and digital asset can be stored on nodes that are not blockchain nodes, including nodes owned and controlled by a retailer, which can allow for the modification of the digital asset. In some cases, it can be expensive to store digital assets on a blockchain node, and therefore, the digital asset can be stored on any other computing node, or distributed across computing nodes, and referenced in the NFT that is itself on the blockchain. The one or more blockchain nodes may be responsible for storing data that is contained in the blockchain ledger. Each of the one or more blockchain nodes may store (e.g., in memory, such as, the memory 210, 220, 232) a copy of the blockchain ledger, e.g., a deed tracking various transactions of, and modifications to, a digital asset, such as a digital golf course.

The one or more blockchain nodes may each be a computing device located at one or more geographic locations, thereby creating a decentralized computing architecture. The blockchain network may be a public network (e.g., available to any user), or a private network (e.g., available to a specific set of users). For example, an organization may develop an application for storing NFTs corresponding to both digital and physical objects or places, e.g., golf courses, golf holes, golf clubs, golf club sets, golf bags, articles of footwear, or articles apparel. The application may be a mobile application, or desktop application, or web-based applet, comprising computer-readable instructions stored in, for example, the memory 210, 220, 232, and configured to be executed by, for example, the processor 202, 212, 222 (see FIG. 2). Any user who downloads the application onto a computing device, may then add their computing device to the blockchain network as a blockchain node. In some embodiments, the blockchain network may be private and, thus, limited to users who download the organization's application and obtain authorization to participate. If the application is available to the public, then the blockchain network may be a public network. However, if the organization restricts who has access to the application, or restricts authorization for select individuals who download the application from becoming a blockchain node, then the blockchain network may be a private network, such as e.g., a permissioned network. Generally speaking, the permissioned network is a distributed ledger that is not publicly accessible and can only be accessed by users with certain permissions, and the users can only perform specific actions granted to them by the central owner or the ledger administrators and are required to identify themselves through certificates or other digital means. In some embodiments, the blockchain network may be a known blockchain network (e.g., Bitcoin, Ethereum, or the like), and the permissioned network may be a sub-set or service associated with a known blockchain network.

The blockchain network may be an open, yet encrypted peer-to-peer network in which asset transaction records are linked via cryptographic hash functions in a distributed, immutable ledger of interconnected blocks. Each blockchain node may contain a ledger of blocks that includes one or more digital asset transactions accompanied by corroboration information representing a validity of each transaction as assessed by peer-validation devices, e.g., the other blockchain nodes in the blockchain network. Encrypted, decentralized computing architectures allow for authentication of transacted assets while preventing duplication of a cryptography-protected ("cryptographic") digital asset registered to the blockchain network. Decentralized asset management may work by encrypting a proprietary asset file, breaking the encrypted code into segments, and sending the segments to numerous different blockchain nodes (e.g., the blockchain nodes) in the blockchain network. A validated owner may be provided with a private key that indicates where in the network the digital asset is located and how to reassemble or "decrypt" the file. For use as a distributed ledger, an individual blockchain may be managed by a host administrator and distributed to multiple peers collectively adhering to a protocol for inter-node communication and transaction validation.

The golf or course NFT may be a digital asset stored in the blockchain network. The golf or course NFT may include or may reference metadata corresponding to golf results, a digital golf course (e.g., 2D representation, or a 3D representation of a virtual golf course), and/or a golf or course token ID. The golf or course token ID may be a 32-bit, 64-bit, or 128-bit alphanumeric code that is sectioned into individual segments. For example, the alphanumeric code may be sectioned into 2 segments, 4 segments, 8 segments, 16 segments, or 32 segments. One or more of the code segments may correspond to common attributes between the virtual golf course and a physical golf course corresponding to the virtual golf course. Additionally, or alternatively, the one or more code segments may correspond to attributes of solely the physical golf course, or solely the digital golf course. In come embodiments, the one or more code segments may correspond to attributes or results from a golf round or competition. For instance, the golf or course NFT can include a URI specifying a location where metadata of the digital asset can be located. The metadata provided at the web address specified can serve a list or attributes of the digital asset in JSON format that is provided in accordance with contemporary and relevant standards, such as, e.g., an Ethereum Request for Comments (ERC) 721 (Non-Fungible Token Standard) or ERC1155 (Multi Token Standard), among other relevant standards and as appropriate for the particular blockchain network and applications used therewith. This metadata can be stored on the one or more servers 140, which can be controlled by the manufacturer or the retailer.

For example, using the example of a golf club, the metadata provided at the URI address specified in the NFT and hosted on servers 140 can correspond to one or more attributes from the group of: a golf club image, golf club handing (i.e., left hand or right hand orientation), golf club size, golf club type, golf club fit, golf club color, golf club model, location of manufacture, date of manufacture, or date of purchase. Additional combinations of the above-listed attributes should be recognized by those of ordinary skill in the art.

In another example, the code segments may include metadata corresponding to one or more attributes from the group of: a golf club image, a golf hole, a golf green, a golf hazard, a golf fairway, a golf course, a golf pin location, a topography or slope of a golf course, a golf club model, location of manufacture, date of manufacture, or date of purchase. In addition, the code segments may include metadata corresponding to the results of a golf round, the amount of pars, birdies, eagles, double eagles, bogeys, double bogeys, and triple bogeys received in a round, the conditions of the round, the location of the round, the results of a round compared to a single golfer or group of golfers, and any unique events that may have occurred in the round, i.e., hole in one, chip in, etc. Additional combinations of the above-listed attributes should be recognized by those of ordinary skill in the art.

The attribute golf course type may comprise metadata corresponding to the slope of the greens, the slope of the fairways, the green type, the course or hole type, the hole, the hazards of the hole, the length and/or width of the holes, the par of the hole, the foliage around the golf hole or course, and the shape of the greens. It is noted herein that any portion or feature of a golf course or golf hole may comprise metadata that affects the golf or course NFT.

In some embodiments, metadata of a golf club can be stored on computing nodes that are generally similar to servers 120, but are not part of the blockchain network. For example, in some embodiments, it can be advantageous to include attributes of a golf club in a NFT that could not be encoded in a 32-bit, 64-bit, or 128-bit code. An attribute club, for example could have a custom design that does not correlate to a designated value within the code in the NFT, and would therefore need to be specified outside of the code. A cost of storing this information on a blockchain node can further be prohibitive to including additional information about an attribute golf club, which can in turn increase a cost of the NFT and impose practical limitations on the amount and structure of the data stored in an NFT. Further, third-party applications may require attributes of an NFT to be differently formatted to read and interpret the attributes of an NFT. An NFT marketplace, for example, can expect information of an NFT to be in JSON format or XML, format in order to accurately represent information about the NFT, in accordance with the ERC 721 and/or the ERC 1155 standards. Thus, in some embodiments, metadata of the attribute golf club can be stored on nodes that are not themselves blockchain nodes. This metadata can, for example, be in JSON format and can provide an unlimited number of attributes of a golf club in custom fields of the JSON object. The JSON payload can be accessible at a web address (e.g., a URL endpoint), and the endpoint can be provided in the body of the NFT as a URI, according to the ERC 721 and ERC 1155 standards. Thus, third-party applications (e.g., third-party integration 420 in FIG. 4), such as video games or online NFT marketplaces could read the URI from the body of the NFT, and access the web address specified in the URI to obtain information about the attribute golf club. The computing nodes used to store metadata of an attribute golf club could be hosted by the provider of the NFT, and can be updated by the provider, or could be hosted on a third-party NFT hosting service in the cloud, which could, for example, ensure immutability of the NFT.

One should appreciate that the disclosed systems and techniques provide many advantageous technical effects including construction and storage of a blockchain representing user-to-user transactions of virtual collectables. Further the blockchain technology enables the creation of unique, yet fully transferrable digital assets that maintain value by way of the general inability to make lossless copies (unlike traditional, unsecured digital files).

Figure 4:
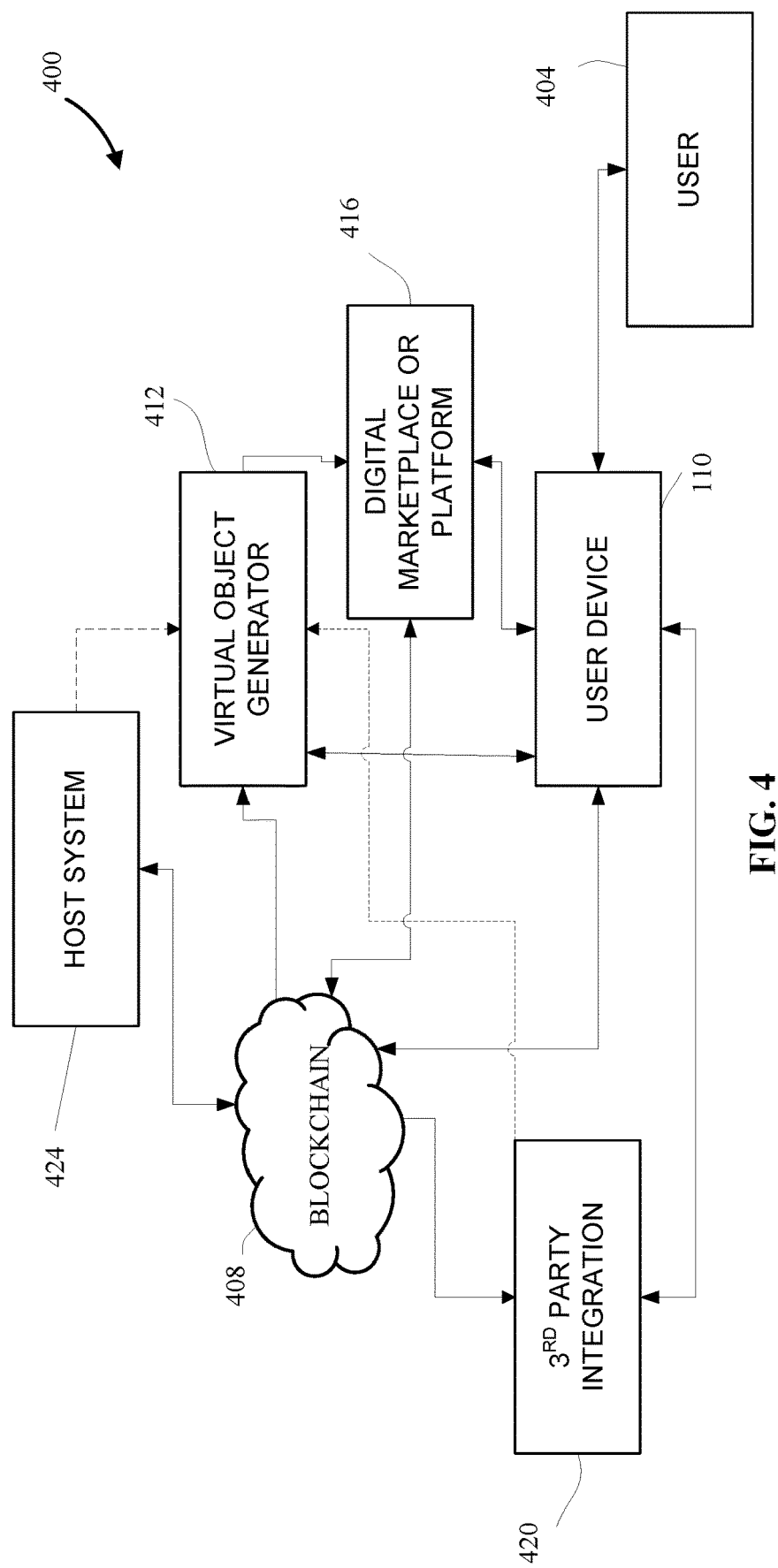
FIG. 4 depicts another schematic representation of an example blockchain network according to some embodiments of the present disclosure.

FIG. 4 provides a schematic representation of a functional structure of a decentralized computing system or blockchain network 400, similar to the blockchain network 300 of FIG. 3. As generally illustrated, a user 404 may operatively interface with the user device 110 that may include one or more of a smartphone, a tablet computer, a smart watch, a virtual reality computing device, an augmented reality device, a laptop computer, a desktop computer, a standalone video game console, smart footwear/apparel, or other similar internet enabled devices, e.g., a television, an exercise machine or device, or a vehicle, among other examples. The user device 110 may be operatively configured to communicate with one or more of an immutable public database (e.g., a blockchain service/network 408—referred to as "blockchain network 408"), a virtual object generator 412, an online digital marketplace or platform 416, and/or a third ($3^{rd}$) party integration service 420.

In general, the blockchain network 408 may include at least one non-fungible token registered thereon that includes information representative of a digital asset. The user 404, via the user device 110, may be in possession of or may have a wallet that includes a private cryptographic key that permits the user device to read the encrypted data associated with the token. This key may further enable the user 404 to freely transfer ownership of the token.

The virtual object generator 412 may be provided to create a digital object on the basis of the information associated with the token. The virtual object generator 412 may employ a plurality of style and artistic rules such that the resultant digital objects are unique, yet recognizable according to predefined silhouettes, styles, articles, or characters. In some embodiments, or on the basis of auxiliary factors, such as the age of the asset, user activity (tracked via the user device), or use via third party platform. The virtual object generator 412 and/or blockchain network 408 may further be in communication with the hosted digital marketplace 416, forum, social platform, or the like. The digital marketplace may represent a plurality of virtual objects in a manner that permits the organized trade and/or sale/purchase of the virtual objects between parties. Upon closing of the sale or transfer, the digital marketplace 416 may update the blockchain network 408 with the new ownership information and facilitate the transfer of new or existing keys to the new asset holder. In some embodiments, the marketplace 416 may further enable various social engagement functions, such as voting or commenting on the represented virtual objects. Likewise, in some instances the marketplace 416 may be configured to assess and score the scarcity of a particular virtual object based on the sum total of the object's expressed features or characteristics, as well as consideration of any of the auxiliary factors. Such a scarcity score may then enable the marketplace (and/or users who participate within the marketplace) to better assess the value of the object.

Further, the system or network 400 may further include the 3rd party integration service 420 that may enable the use of the virtual object in different contexts or manners. The 3rd party integration service 420 may operate as an API on an app provided on the user's device, or as a dedicated cloud-based service. In some embodiments, the 3rd party integration service 420 may make the virtual object (e.g., as expressed by the virtual object generator 412), and/or the information available for external use. Examples of such a use may include skins on 3rd party video game characters, objects capable of being used by 3rd party video game characters, digital artwork displays, physical 2D print generation, manufacturing production, such as, e.g., 3D print generation, and the like. In one embodiment, the information and/or scarcity score may be made available and may alter the characteristics or abilities of a user's video game character in a video game played on the user's device 110.

A corporate host system 424 may be in communication with the blockchain network 408 for the purpose of provisioning and/or initially creating new digital assets. Additionally, the host system 424 may provide one or more rules to the virtual object generator 412 to constrain the manner and style in which genomic information from the blockchain network 408 is expressed in a visual/artistic form.

Figure 5:
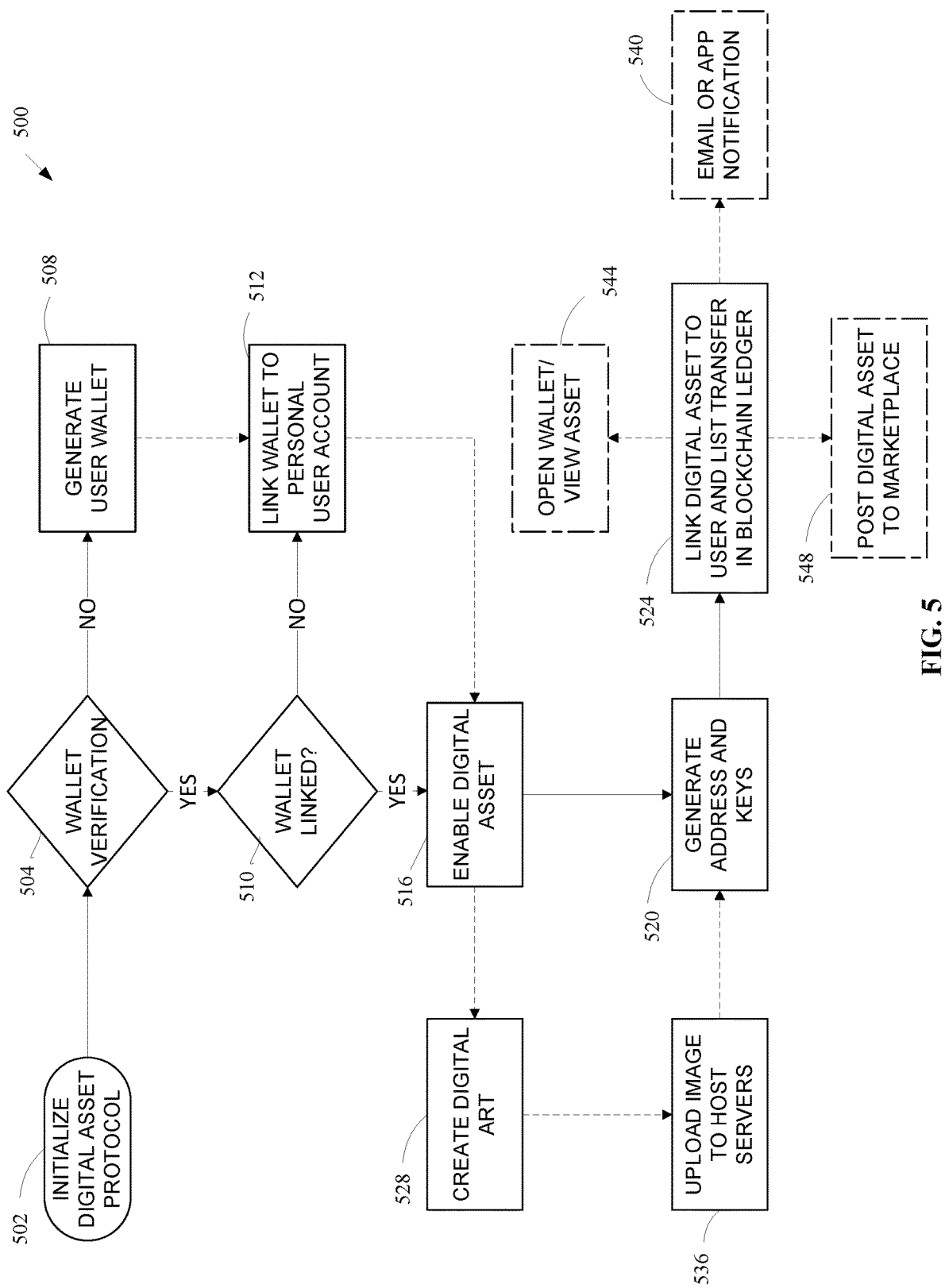
FIG. 5 depicts a flowchart for an example method of generating a digital asset authenticated by a non-fungible token according to some embodiments of the present disclosure.

With reference to FIG. 5, a method or process of generating a digital asset authenticated by NFTs on a blockchain ledger is generally described in accordance with aspects of the present disclosure. Some or all of the operations in FIG. 5 and described in further detail below may be representative of an algorithm that corresponds to processor-executable instructions that may be stored, for example, in main or auxiliary remote memory, and executed, for example, by a resident or remote controller, central processing unit (CPU), control logic circuit, or other module or device or network of devices, to perform any or all of the above or below described functions associated with the disclosed concepts. It should be recognized that the order of execution of the illustrated operation block may be changed, additional blocks may be added, and some of the blocks described may be modified, combined, or eliminated.

The method 500 of FIG. 5 starts at terminal block 502 with processor-executable instructions for a programmable controller or control module or similarly suitable processor to call up an initialization procedure for a protocol to generate a cryptographic digital asset, such as a computer-generated digital golf course and encrypted token key. This routine may be called-up and executed in real-time, continuously, systematically, sporadically, and/or at regular intervals. As a representative implementation of the methodology set forth in FIG. 5, the initialization procedure at block 502 may automatically commence each time a virtual golf course is created, once the user 404 has completed a competition or round of golf, each time the user 404 purchases the green fees for the physical golf course, or each time the user 404 unlocks an access key. Alternatively, the initialization procedure may be manually activated by an employee at a POS terminal or by the manufacturer/designer.

Next, the method 500 proceeds to decision block 504 to determine if the user 404 has procured a cryptocurrency wallet or other similarly suitable digital blockchain account that is operable, for example, to upload and maintain location and retrieval information for digital assets that are encrypted and stored in a decentralized manner. A cryptocurrency wallet typically stores public and private key pairs, but does not store the cryptocurrency itself; the cryptocurrency is decentrally stored and maintained in a publicly available blockchain ledger. With the stored keys, the owner may digitally sign a transaction and write it to the blockchain ledger. A platform-dictated smart contract associated with the wallet may facilitate transfer of stored assets and create a verifiable audit trail of the same. If the user 404 has not already acquired a digital blockchain wallet, the method 500 continues to predefined process block 508 to set up a wallet. By way of non-limiting example, the user 404 may be prompted to visit or may be automatically routed to any of an assortment of publicly available web sites that offer a hardware wallet for cold storage of cryptocurrency (e.g., storage of cryptographic keys associated with cryptocurrency and NFTs) such as an ERC20-compatible Ethereum wallet provided by MyEtherWallet, or Metamask, among other viable sources or providers.

Once the system confirms that the user 404 has a suitable digital blockchain wallet at process block 504, the method 500 may check if the wallet is linked to a personal user account at decision block 510. In some instances, the user 404 may have already linked a wallet to a user account in a prior transaction, and thus, the method 500 could proceed to process block 516. Where the user 404 has not linked their wallet, the method 500 may automatically link, or prompt the user 404 to link, the digital blockchain wallet to a personal user account, as portrayed at process block 512 of FIG. 5. This linking at process block 512 may proceed automatically if a wallet was generated at process block 508, without the need to perform a check at decision block 510 of whether the wallet has been linked. Linking a wallet to a personal account at process block 512 may require the remote host system 424 retrieve a unique owner ID code associated with the purchasing party (e.g., user 404) from an encrypted relational database, e.g., provisioned through cloud computing system 130. At this time, a unique golf ID code associated with the creation of a virtual golf course is linked to the user's personal account.

Upon determining that the user 404 has acquired a digital blockchain wallet, i.e., block 504=YES, and that the wallet is linked to a personal user account, i.e., block 510=YES, or after linking the user's blockchain wallet to their personal user account at block 512, the method 500 continues to input/output block 516 to enable a cryptographic digital asset associated with the virtual golf course. As indicated above, after creating the virtual golf course, the universally recognized UPID product code may be used to link a collectable virtual golf course NFT that is identified by an encrypted token key, and is generally associated with the virtual golf course. In some embodiments, the UPID may be used to trigger a function of the virtual golf course NFT, such as compensation for a third party, e.g., a player or creator, associated with or identified by the metadata of the virtual golf course NFT. A third-party or a retailer at a POS terminal or the user 404 employing their user device 110 may scan the UPID or UPC. Accordingly, enabling a cryptographic digital asset, at block 516, may be automatic, random, systematic, prize based, or any logically appropriate manner.

After receiving confirmation that a cryptographic digital asset has been authorized at input/output block 516, the method 500 generates a cryptographic digital asset for the golf course. This may comprise generating a unique, encrypted asset code with a contract address (i.e., the address where the smart contract is deployed on the blockchain network), a token, and a public and private key pair, as denoted at predefined process block 520. Host system 424 may transmit the token, with the public key and the owner ID, to a distributed blockchain ledger to record and peervalidate transfer of the cryptographic digital asset to the user 404 on a transaction block. The method 500 continues to process block 524 to link the cryptographic digital asset with the unique owner ID code. This control logic may comprise executable instructions for assigning the encrypted asset code to the user 404 and storing the public and private keys in the user's digital blockchain wallet.

As shown in FIG. 5, once the digital asset has been linked to a user, as through transfer to the user of the NFT securing the digital asset, optional process block 540 may issue a digital notification, such as an email or push notification, to the user's smartphone 110, or other electronic device, with all related information for accessing, transferring, and intermingling the cryptographic digital asset. Additionally or alternatively, the remote host system 424 may operate as a web server hosting a web-based graphical user interface (GUI) that is operable to translate the data stored in the encryption keys into a visual image that is displayed to the user 404 at optional process block 544. Digital asset manipulation and use may also be effectuated through the user's digital blockchain wallet. This may comprise posting the cryptographic digital asset to an online crypto-collectable marketplace or platform, as provided in optional process block 548.

With continuing reference to FIG. 5, the method 500 proceeds to process block 528 to produce the virtual representation or "digital art" of the cryptographic digital asset. The virtual representation may include a computer-generated avatar of the golf course or a limited-edition artist rendition of a golf feature or logo related to the golf course or competition played, or a particular brand of golf club. It is also envisioned that one or more attributes of the virtual representation of the cryptographic digital asset may be created, in whole or in part, via the user 404. A machine learning function may be executed at predefined process block 528 in order to generate image features through a neural network. Upon completion of the digital art, the image may be uploaded to the cloud computing system 130 at block 536. In addition, optional process block 540 may issue a digital notification, such as an email or push notification, to the user's smartphone, or other electronic device, with all related information for accessing, transferring and intermingling the cryptographic digital asset. The remote host system 424 may operate as a web server hosting a web-based graphical user interface (GUI) that is operable to translate the data stored in the encryption keys into a visual image that is displayed to the user 404 at optional process block 544. Digital asset manipulation and use may also be effectuated through the user's digital blockchain wallet. This may comprise posting the cryptographic digital asset to an online crypto-collectable marketplace or platform, as provided in optional process block 548.

Generally, by incorporating, i.e., providing and linking, metadata into the non-fungible token (NFT) that corresponds to attributes of a physical golf course, the digital golf course corresponding to the NFT will be linked to the physical golf course. In some embodiments, the metadata includes reference to a Geo-Reference ID (GRID) that corresponds to the physical code, or a version thereof, associated with the physical golf course, thereby linking the golf or course NFT to the physical golf course in a one-to-one fashion. In some embodiments, the golf or course NFT may be provided as a collection or family of golf or course NFTs having, e.g., variations or permutations in attributes or appearance or underlying metadata, but with each golf or course NFT in the collection being linked to the same physical golf course by way of reference to the GRID in the metadata. In this way, a physical golf course can be linked across multiple golf or course NFTs that are generated as a collection of golf or course NFTs, each containing unique digital golf course features. The golf or course NFTs can, therefore, be a collection of two (2) or more, such as, e.g., a collection of 3, 4, 5, 6, 7, 8, 9, 10, 11, 12, or more, a collection of 20 or more, a collection of 50 or more, a collection of 100 or more, a collection of 250 or more, or a collection of 500 or more.

Figure 6:
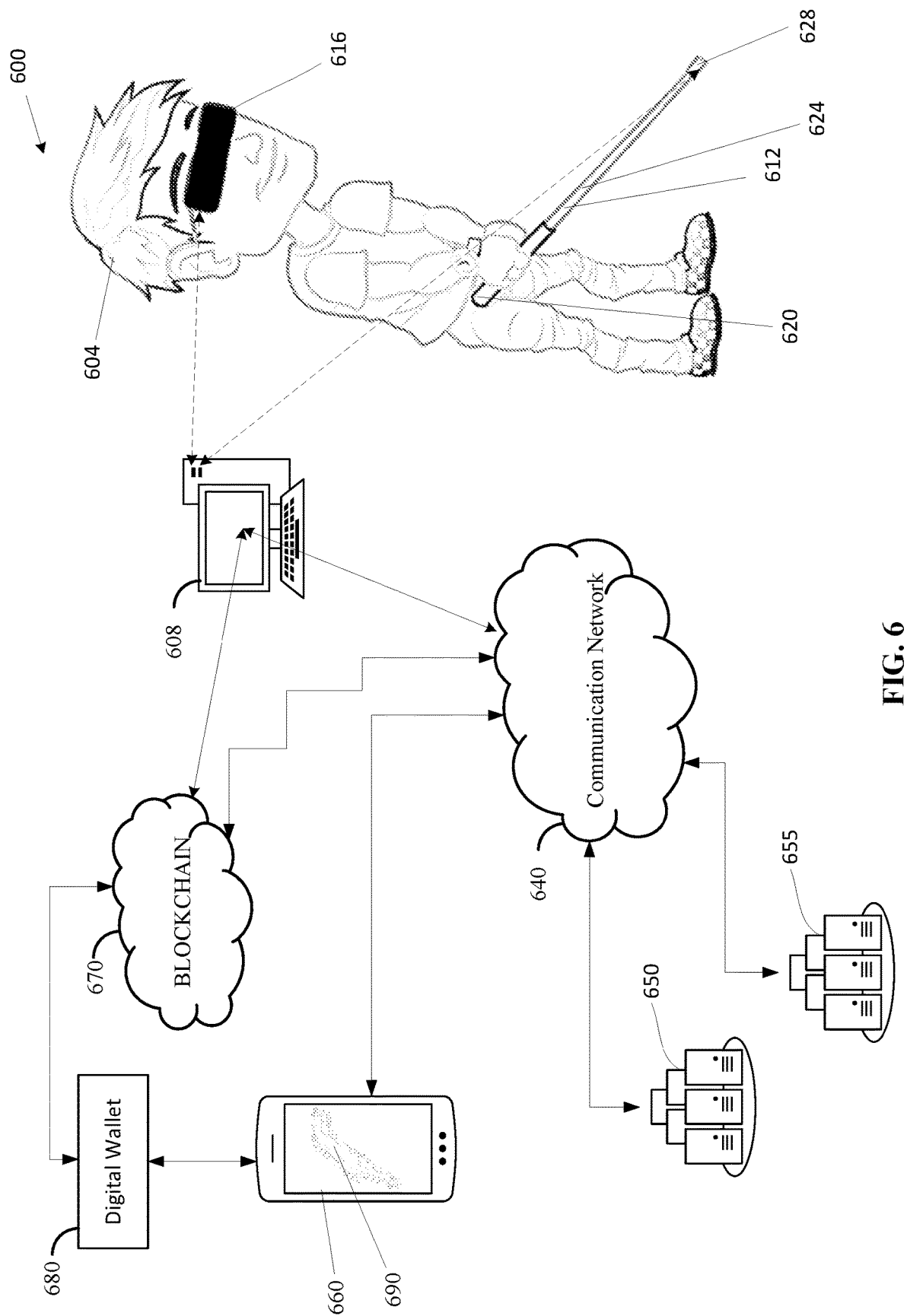
FIG. 6 depicts a schematic representation of an embodiment of a golf system.

Referring to FIG. 6, a schematic representation of an exemplary golf system 600 is depicted for a user 604. As noted herein, the golf system 600 may be used to play virtual golf in a virtual environment, e.g., the metaverse. The golf system 600 includes a computing device 608, such as the computing device 110, that is in communication with a user controller 612, such as the user controller 140 in FIGS. 1 and 2, and at least one augmented reality device 616, e.g., a virtual reality headset. The at least one augmented reality device 616 displays a virtual golf course or a hole in a virtual environment. In the illustrated embodiment, the user 604 is holding the user controller 612 at address, similar to how a golfer would hold a real golf club. Similar to a physical golf club, the user controller 612 can include a grip 620, a shaft 624, and a hosel or far end 628. In the present embodiment, the user controller 612 does not comprise a golf club head. However, in some embodiments, the user controller 612 may comprise a golf club head (see FIG. 7).

The user controller 612 is provided for detecting information, storing information, and/or transferring information to the computing device 608, the at least one augmented reality device 616, and/or the virtual environment, e.g., metaverse. For example, the user 604 may use the user controller 612 as a controller or median to simulate a golf club in the virtual environment. In some embodiments, the user controller 612 may be represented as a virtual golf club through the augmented reality device 616 in the virtual environment. Therefore, the user 604 can swing the user controller 612 to swing the virtual golf club in the virtual environment, i.e., the user controller 612 can be used to play golf in the virtual environment.

As discussed above with respect to FIG. 2, the user controller 612 can comprise the sensors 230 or inputs 226 that communicate with the computing device 608 to impart responses in the virtual environment through the at least one augmented reality device 616, e.g., virtual reality headset. In some embodiments, the sensors 230 can detect the speed of the swing, the grip of the user 604, the line/direction of the swing, the rotation of the user controller 612 while the user 604 is swinging, and the angle of the user controller 612. As noted herein, the sensors 230 can be positioned on any portion of the user controller 612. In some embodiments, the sensors 230 may be spaced out along the user controller 612. For example, some sensors 230 may be positioned on or in the hosel or far end 628 of the user controller 612, some of the sensors 230 may be positioned on or in the shaft 624 of the user controller 612, and some of the sensors 230 may be positioned on or in the grip 620. In some embodiments, different types of golf grips and/or golf shafts may be used on the user controller 612, similar to a physical golf club. Therefore, the user 604 can customize the user controller 612 to fit the attributes that the user 604 desires. Further, in some embodiments, the different grips 620 and/or shafts 624 for the user controller 612 may cause the virtual golf club in the virtual environment to perform differently. In particular, the different grips 620 and/or shafts 624 for the user controller 612 may be linked or perform in a similar fashion as the grips and shafts do for physical golf clubs. For example, the user 604 may buy a stiff shaft for the user controller 612. The stiff shaft on the user controller 612 may then cause the virtual golf club in the virtual environment to also include a stiff shaft and perform similarly to a corresponding physical shaft in the physical world.

Further, in some embodiments, the user 604 may be able to select virtual golf clubs in the virtual environment that correspond to physical golf clubs. The virtual golf clubs in the virtual environment may have the same metrics as the corresponding physical golf clubs in the physical environment. Therefore, if the user 604 has a loyalty to a brand or prefers a specific brand, the user 604 may be able to purchase or obtain virtual golf clubs associated with that brand in the virtual environment. These virtual golf clubs will perform the same as the corresponding physical golf clubs. For example, certain virtual golf clubs can perform better, e.g., improved aerodynamics or mass distribution or coefficient of restitution (COR), to allow for improved performance, e.g., increased shot distance, shot control and accuracy, shot spin, etc., as compared with other virtual golf clubs, depending on the corresponding physical golf clubs that they relate to. In some embodiments, multiple user controllers 612 can be sold or obtained by the user 604. These user controllers 612 may correspond to actual physical golf clubs and therefore perform differently, depending on the corresponding physical golf clubs.

It is contemplated that digital advertisements or display advertisements may be provided for the user 604 via the augmented reality device 616. For example, a brand may advertise products, e.g., virtual golf clubs or physical golf clubs, to the user 604 through the augmented reality device 616 while the user 604 is playing, e.g., in-game, such that the user 604 may purchase virtual or physical products or services promoted by the brand in-the-moment. This may allow the user 604 instant access to the product or service, which can be valuable for in-game play. Various advertisements are contemplated, such as promotions or offers to join an event, to play a virtual or physical golf course, to purchase attributes or modifications to existing virtual golf clubs or courses, tickets to competition, training or educational sessions, or cryptographic tokens, among others. Some brands may be associated with the virtual golf course and, thus, branding may be applied to the virtual golf course by way of the augmented reality device 616. The digital advertisements may be static, such as images or banners, or dynamic, such as a video or animated image. The digital advertisements may be push notifications. In one example, push notifications sent by administrators of the physical golf course may be displayed by the augmented reality device 616 to notify a user to speed up the pace of their play, or to allow someone else to pass them on the physical golf course, or to warn of hazardous conditions ahead.

Still referring to FIG. 6, the computing device 608 is in communication with one or more communication networks 640, e.g., the communication network 130, one or more servers 650 (e.g., the server 120), one or more servers 655, and a user device 660, e.g., the user device 110. Data or information from the virtual golf in the virtual environment may be transferred from the computing device 608 to the user device 660 and the one or more servers 650, 655. In some embodiments, other users can watch the user 604 play golf in the virtual environment via the one or more user devices 660. Further, the user 604 may be able to set preferences or factors on the user device 660 that impact the virtual environment which the user 604 is playing in. For example, the user 604 may select mild or challenging weather in the virtual environment, difficult pin placements in the virtual environment, and/or different tees in the virtual environment from the user device 660. As noted herein, the computing device 608 may be an online computing device 608 or a private computing device.

With reference still to FIG. 6, the computing device 608 of the golf system 600 is also in communication with a blockchain network or blockchain 670, portions of which can be stored on or executed on the one or more servers 650. The blockchain 670 may be public or private, and may be a known blockchain (e.g., Ethereum) or a proprietary or novel blockchain. Further, the user device 660 may also be in communication with the blockchain 670, such that a user's digital wallet 680, is linked to the blockchain 670. In some embodiments, the user device 660 is a smartphone. In the illustrated embodiment, the display screen of the user device 660 can display a digital object 690 produced in connection with the golf system 600, as will be described below.

As the platform on the computing device 608 collects, processes, sorts, and organizes the data captured by the golf system 600, Golf Data GD is produced and stored in the memory of the computing device 608 or on the server 655 connected to the computing device 608. The Golf Data GD may include any of the data gathered by the golf system 600, data that is entered into the software application by the user 604, metrics or statistics that are calculated by operation of the software application of the computing device 608, results of the user 604 playing on the virtual golf course, or the like. In some instances, the Golf Data GD includes information associated with the user's 604 particular session with the golf system 600, including a date, a time, a duration, results of the round, results of a single hole, information about the golf club or clubs used, information about the ball, captured data from one or more sensors (see FIG. 7), information manually entered or provided to the golf system 600, and the like. The Golf Data GD can be stored as a file for retrieval and access by the computing device, for transport to other computing devices across a communication network, or the like. The Golf Data GD may be stored as any suitable type of file format, such, as, e.g., an XML, and RDF, a JSON, a Microsoft Excel Spreadsheet, a CSV, a Text Document, including a Microsoft Word document or a PDF, a Plaint Text document, an HTML, or any other proprietary or open source file formats.

The computing device 608 can communicate with nodes (e.g., one or more servers 650) on the blockchain 670 and, accordingly, the computing device 608 of the golf system 600 can have access to various operations in connection with the blockchain 670. In some embodiments, the computing device 608 can interact with a smart contract hosted on a node of the blockchain 670 to execute a protocol associated with the software application to generate the digital object 690 that can be secured with a non-fungible token NFT and minted to the blockchain 670. Further, the computing device 608 may write or record portions of or all of the Golf Data GD associated with the user 604 and the golf system 600 to the metadata of the NFT, which can be hosted on the one or more servers 655, such that the Golf Data GD may be immutably recorded and accessible on the blockchain 670. In this way, the golf system 600 can be executed to generate a GolfNFT, i.e., an NFT associated with and securing a digital asset having metadata associated with or at least partially including Golf Data GD. In some embodiments, the computing device 608 of the golf system 600 generates a report based on the Golf Data GD collected in association with a use of the golf system 600 by the user 604, and the report may be written and recorded in the metadata of the GolfNFT.

The GolfNFT may be configured with a variety of features and operations by way of the underlying smart contract. In some embodiments, the digital object is generated as a result of or based on the Golf Data GD, such that each digital object corresponds to the Golf Data GD in a unique, one-of-one manner. In some embodiments, the digital object is generated by applying a variety of image processing techniques or algorithms, such as, e.g., color or tone filters, mosaic plots, binary image rendering, 8-bit image rendering, 16-bit image rendering, grayscale rendering, black-and-white rendering, whitewashing, brightness, contrast, sharpness, transparency, or any other image processing technique. In some embodiments, the digital object is generated using, e.g., a permutation generator for producing recursive permutations associated with the Golf Data GD.

Further, the GolfNFT can be configured to include royalty amounts RA that are triggered by downstream transactions on the blockchain 670. The royalty amounts RA can be configured by the user 604. The royalty amounts RA can be fixed at the time of minting or creation of the GolfNFT, such that the royalty amounts are immutable for the life of the GolfNFT. Additionally, intellectual property rights, including copyrights and trademarks rights, among others, associated with the GolfNFT may be transferred or retained by the user 604, a Brand, or a third-party. For example, the digital object of the GolfNFT may include a logo, a tradename, a name, a likeness, an image, a product, or the like, or some combination thereof, and any intellectual property rights associated with, created in, or implicated by the digital object may be transferred or excluded from transfer in downstream transactions. Additionally, the royalty amount RA may be determined in connection with the intellectual property rights created and/or transferred or retained via the GolfNFT. It will be appreciated that concepts associated with the GolfNFT may similarly be associated with other types of cryptographic tokens, including utility tokens or security tokens, or various standards, including Ethereum standards (e.g., ERC-20, ERC-721, ERC-777, ERC-1155).

Figure 7:
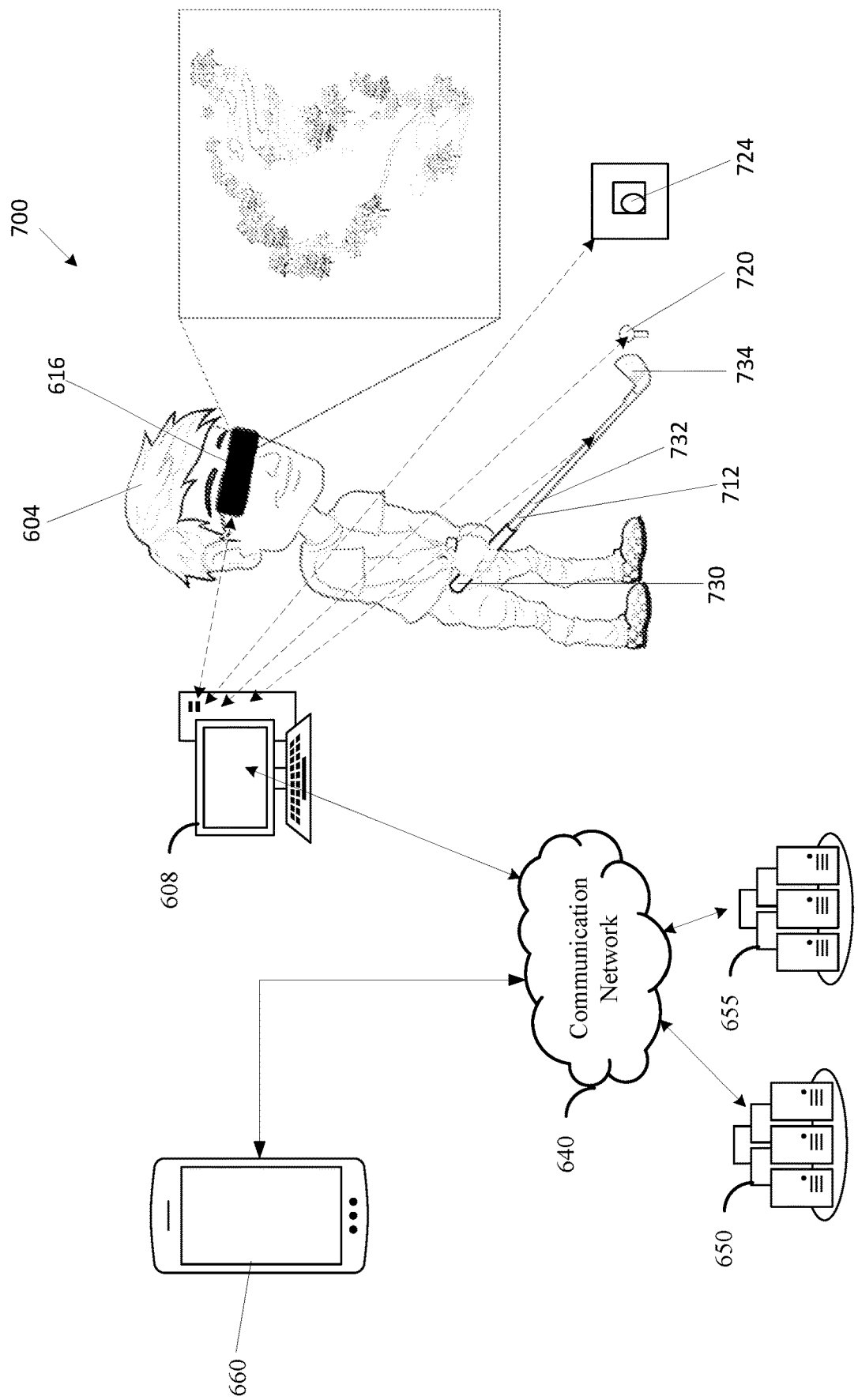
FIG. 7 depicts a schematic representation of another embodiment of a golf system.

Referring to FIG. 7, like reference numbers are used with regard to another schematic representation of an exemplary golf system or an augmented reality system 700, which is depicted for the user 604. As noted herein, the golf system 700 may be used to play virtual golf in a virtual environment. The golf system 700 includes the computing device 608 that is in communication with a user controller 712, e.g., the user controller 140, at least one augmented reality device 616, e.g., a virtual reality headset, a golf ball 720, and a golf sensor 724. Similar to the golf system 600, the at least one augmented reality device 616 can display a virtual golf course or a hole in a virtual environment, e.g., the metaverse. For example, the augmented reality device 616 can include a user interface and a display screen. In the illustrated embodiment, the user 604 is holding the user controller 712 at address, similar to how a golfer would hold a real golf club. Similar to a physical golf club, the user controller 712 includes a grip 730, a shaft 732, and a head 734.

Further, similar to the golf system 600, the user controller 712 is provided for detecting, storing, and/or transferring information to the computing device 608, the augmented reality device 616, and the virtual environment, e.g., the metaverse. For example, the user 604 may use the user controller 712 as a controller or median to simulate a golf club in the virtual environment, e.g., the metaverse. Therefore, the user 604 may swing the user controller 712 and contact the golf ball 720. The golf ball 720 may be securely attached to a tee, i.e., the golf ball 720 does not move off the tee once it is hit (the golf ball 720 rotates back and forth with the tee after it is hit, similar to a pendulum), or the golf ball 720 may be teed up in front of a net or screen (not shown) and be hit into the net or screen. The user controller 712 may comprise various sensors, e.g., the sensors 230, that are configured to capture, comprise, and analysis data and information from the swing and send the data and information to the computing device 608.

Unlike the golf system 600, the golf system 700 comprises the golf ball 720 and the golf sensor 724. The golf system 700 can comprise one or more golf sensors 724 around the user 604 to capture, comprise, and analysis data and information from a golf swing of the user 604 and send the data and information to the computing device 608. The golf sensor 724 can provide additional details and parameters that the user controller 612 in FIG. 6 may not be able to obtain on its own. In some embodiments, the golf system 700 may not comprise any golf sensors 724. Further, the golf ball 720 can also include one or more sensors therein that also communicate with the computing device 608. These sensors may capture, comprise, analyze, and send data or information to the computing device 608, similar to the golf sensor 724 and the user controller 712. Furthermore, the augmented reality device 616 may also comprise sensors used to capture and send data or information related to the user's 604 movements during play. For example, the augmented reality device 616 may be able to determine if the user 604 "looked up" or "took eyes off the ball" while swinging the user controller 712.

In some embodiments, the augmented reality device 616 may capture a first set of data related to the user's swing, the user controller 712 may capture a second set of data related to the user's swing, and the golf ball 720 may capture a third set of data related to the user's swing. The first set, the second set, and the third set of data can be communicated to the computing device 608 and to an online system. A digital response can then be generated in the virtual environment from the first set, the second set, and the third set of data. Put differently, the augmented reality device 616, the user controller 712, and the golf ball 720 can communicate with the computing device 608 to provide information about a user's swing to the virtual environment, e.g., the metaverse. Therefore, the user 604 can swing and hit the stationary or movable golf ball 720 in the physical world, and the parameters and characteristics associated with that swing will be generated and conveyed in the virtual environment through the display of the augmented reality device 616. In some embodiments, the golf sensor 724 can also provide additional data or communication with the computing device 608.

As noted herein, the user controller 712 for the system 700 is in the shape of a golf club. In some embodiments, the user controller 712 may be a hollow golf club or a plastic golf club. In other embodiments, the user controller 712 may comprise a similar weight as a real physical golf club. Further, in some embodiments, the user controller 712 may be similar to the user controller 612 in FIG. 6. As discussed above with respect to FIG. 6, the user controller 712 can comprise the various sensors 230 throughout the controller 712 to capture data associated with the user's swing. This data can then be transferred and generated to the virtual environment. In some embodiments, the user controller 712 may be a physical golf club. As discussed above, the physical golf club being used by the user 604 may correspond to the virtual golf club used in the virtual environment. In some embodiments, the user 604 may be able to attach a sensor or apparatus to a user's physical golf clubs. The physical golf club can then be used as the user controller 712 in the system 700. The sensor or apparatus attached to the physical golf club may be able to recognize the club being used and generate the exact same club in the virtual environment, e.g., metaverse. Therefore, depending on the shot, the user 604 can accordingly select different clubs from the user's golf bag. In some embodiments, the system above can be used to test out new clubs, similar to the fitting systems and methods disclosed in U.S. Patent Application No. 63/329,785.

In some embodiments, the at least one golf sensor 724 is provided for detecting information about the user 604, the user controller 712, and the golf ball 720. It will be appreciated that several sensors of varying kinds and types can be employed in the golf system 700. For example, the at least one golf sensor 724 may be a camera, a video motion sensor, a light detection and ranging (LIDAR) sensor, an ultrasonic sensor, an area reflective sensor, a passive infrared sensor, or the like. Further, the at least one golf sensor 724 may be attached to or embedded within (and work with the other sensors in) the golf ball 720 or the user controller 712 to detect the location, acceleration, velocity, force, or some combination thereof. For example, the at least one golf sensor 724 may be a global positioning system (GPS) sensor, a load cell, a strain gauge, an accelerometer, a force sensing resistor (FSR), a receiver or transmitter or transceiver, or the like. Various configurations of the at least one golf sensor 724 are contemplated, such as providing multiple golf sensors 724 about the user 604 to provide a full 360° view about the user 604.

As discussed above, the at least one golf sensor 724, the augmented reality device 616, the user controller 712, and the golf ball 720 captures data associated with the user 604 swinging the user controller 712 to hit the golf ball 720 and the captured data is then communicated to the computing device 608. A software application or platform may run on the computing device 608 and receive the data collected by the at least one golf sensor 724, the augmented reality device 616, the user controller 712, and the golf ball 720. The data can then be generated and transferred to the virtual environment, e.g., the metaverse.

Still referring to FIG. 7, similar to the golf system 600, the computing device 608 is in communication with the one or more communication networks 640, the one or more servers 650, 655, and the user device 660. Data or information form the virtual golf in the virtual environment may be transferred from the computing device 608 to the user device 608 and the one or more servers 655. In some embodiments, other users can watch the user 604 play golf in the virtual environment via the one or more user devices 660, a TV, or a projector. Further, the user 604 may be able to set preferences or factors on the user device 660 that impact the virtual environment which the user 604 is playing therein. For example, the user 604 may select mild or challenging weather in the virtual environment, difficult pin placements in the virtual environment, and/or different tees in the virtual environment from the user device 660.

As noted herein, the golf system 700 can also be in communication with the blockchain network 670 described above with respect to the golf system 600. Therefore, the golf system 700 can produce and store Golf Data FD and GolfNFTs, similar to the golf system 600.

Figure 8:
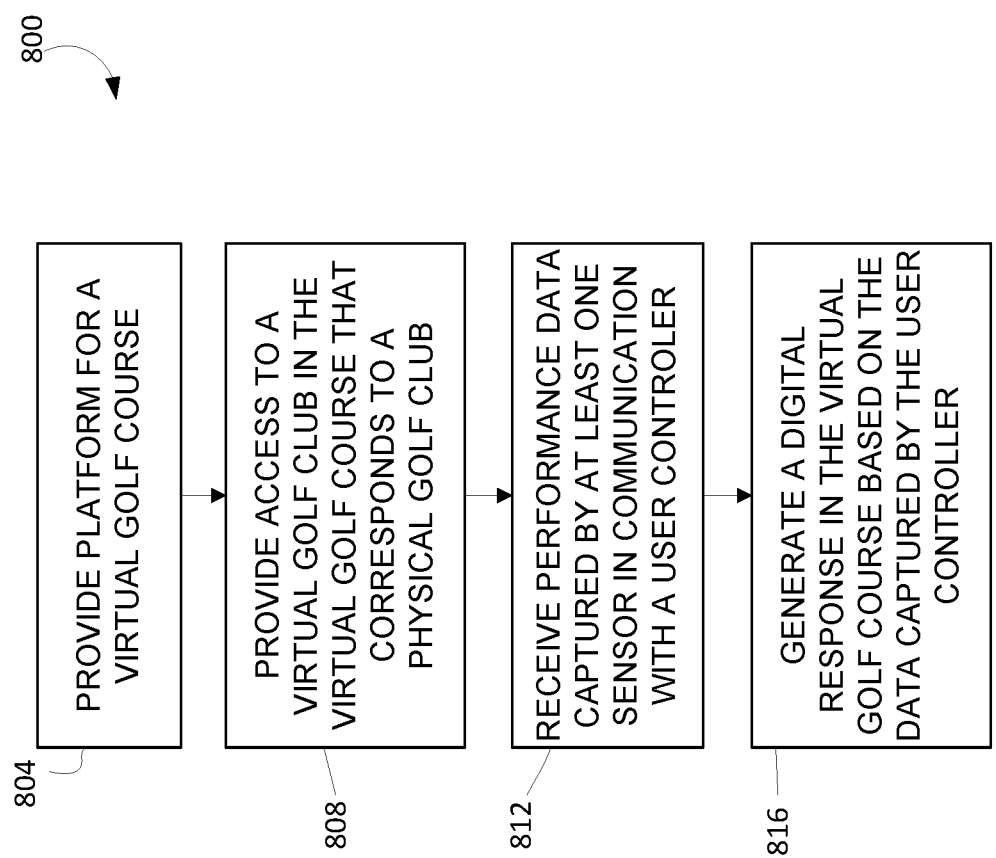
FIG. 8 depicts a flowchart for an example process of playing golf in a virtual environment.

FIG. 8 depicts a flowchart of a virtual golf process 800 in connection with the golf system 600 of FIG. 6 and/or the golf system 700 of FIG. 7. The virtual golf process 800 can be used to play virtual golf in a virtual environment, e.g., metaverse. In step 804, the process 800 includes providing a platform for a virtual golf course. In some embodiments, the virtual golf course can be on the metaverse or in any 2D, 3D or 4D virtual environment. The platform can include the one or more computing devices 110 and/or the one or more servers 120. For example, the platform may be an online platform that is displayed on a user interface of the user device 110. The online platform presents a virtual golf course in the virtual environment.

In step 808, the process 800 includes providing access to a digital golf club in the virtual golf course that corresponds to or is associated with a physical golf club. In particular, the user 604 can use virtual golf clubs in the virtual golf course that are associated with a particular brand or model of physical golf clubs. For example, as outlined above, the virtual golf clubs may look, feel, and/or perform similar in the virtual environment as the physical clubs look, feel, and perform in the physical environment. As discussed above, the user controller 612, 712 may be associated with a physical golf club, or the user 604 may be able to purchase or obtain virtual golf clubs in the virtual environment that correspond to a physical golf club. In some embodiments, the user may be able to use the virtual golf club after purchasing the physical golf club. For example, the user may be able to purchase a new physical driver at a physical golf store. A code or password may be included with the purchase of the physical driver that allows the user to obtain that exact driver (same model and brand) in the virtual environment. In some embodiments, the process 800 may also include providing access to virtual clothing, virtual golf bags, virtual footwear, and virtual golf accessories that correspond to physical clothing, physical golf bags, physical footwear, and physical golf accessories.

In step 812, data is captured by at least one sensor in communication with the user controller 612, 712 and transferred to the computing device 608. Put differently, in step 812, the process includes receiving performance data captured by at least one sensor in communication with the user controller 612, 712. The computing device 608 can then, in step 816, generate a digital response in the virtual golf course based on the performance data. Specifically, through the various sensors 230 in the user controller 612, 712, the swing characteristics of a swing by the user 604 can be determined. These swing characteristics can be transferred and uploaded to the virtual environment and generate a response. In other words, if the user 604 is able to perform a clean, fundamental, i.e., pure, swing on the user controller 612, 712, then that same swing may be transferred and generated in the virtual golf course, i.e., the user 604 would hit the ball the preferred distance and direction in the virtual golf course. In contrast, if the user 604 takes a poor swing with the user controller 612, 712, then the ball may travel in a non-preferred direction, e.g., a slice or a hook depending on the angle of the swing of the user controller 612, 712, in the virtual golf course. As noted herein, the user controller 612, 712 can be formed to emulate a physical golf club and transform data from the swing to the virtual environment to mimic real life golf in the virtual environment. The process 800 allows virtual golf to be played in a virtual environment and mimic physical golf in a virtual environment. Therefore, the user 604 can play and/or improve his/her golf game from any location of their choice. As described above with respect to FIG. 7, in some embodiments, the augmented reality device 616, the golf ball 720, and/or the golf sensor 724 may provide the computing device 608 additional data on the swing of the user 604. Specifically, the augmented reality device 616, the golf ball 720, and/or the golf sensor 724 may also affect the generated response in the virtual environment.

Figure 9:
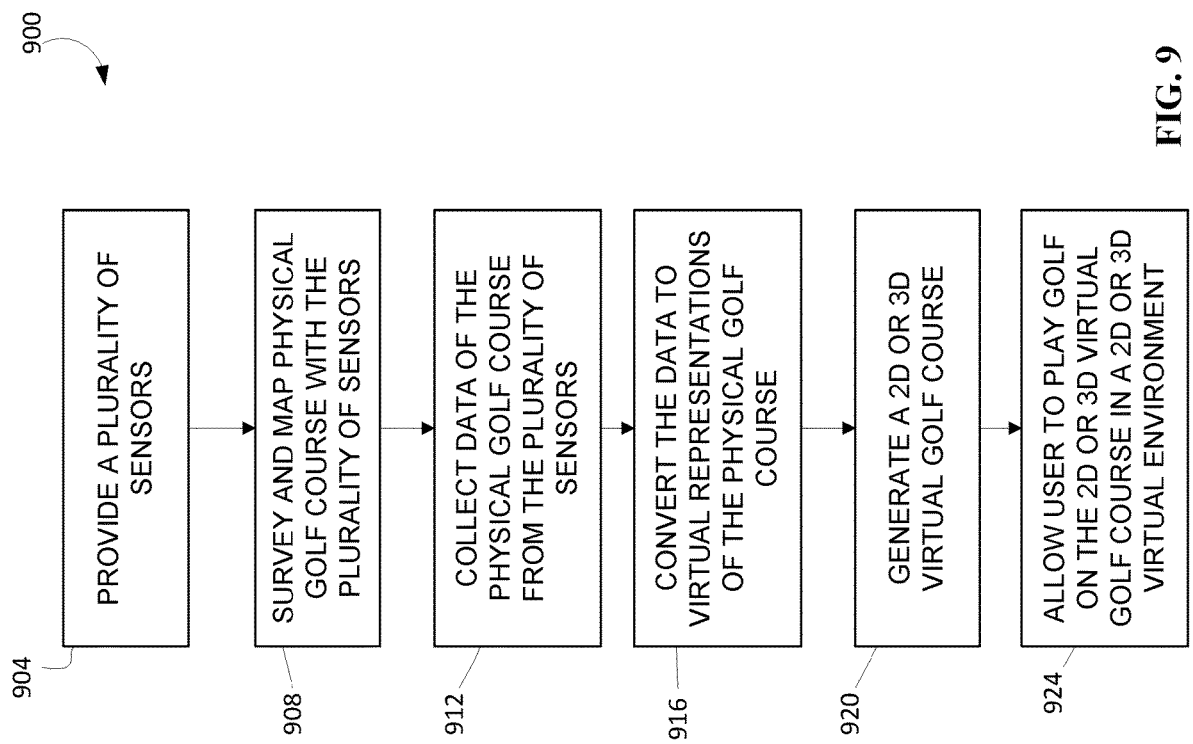
FIG. 9 depicts a flowchart for an example process of playing golf on a physical golf course in a virtual environment.

FIG. 9 depicts a flowchart of a process 900 for playing golf on a physical golf course in a 3D virtual environment, e.g., the metaverse. The process 900 can be performed in connection with the golf system 600 of FIG. 6 and/or the golf system 700 of FIG. 7. In step 904, the process 900 includes providing a plurality of sensors capable of surveying and mapping the physical golf course, e.g., a geo-referencing system or apparatus. In step 908, the process 900 also includes surveying and mapping the physical golf course with the plurality of sensors. It is contemplated that any type of sensor or mapping system can be used to accurately survey and map the physical golf course and the topography of the physical golf course. In some embodiments, a satellite system, satellite images, drones, helicopters, airplanes, and/or vehicles may be used with the plurality of sensors to accurately map the physical golf course. In some embodiments, sensors similar to the golf sensor 724 in FIG. 7 may be used to accurately survey and map the physical golf course.

In step 912, the process 900 includes collecting data of the physical golf course from the plurality of sensors. In step 916, the process 900 further includes converting the data collected from the plurality of sensors to virtual representations of the physical golf course in the virtual environment. In step 920, the process 900 also includes generating a 2D or 3D virtual golf course on a system that allows a user to play golf on the 2D or 3D virtual golf course in the 2D or 3D virtual environment, e.g., the metaverse, in step 924. In other words, the process 900 includes using the data collected from steps 908, 912 to generate the physical golf course in the virtual environment, in step 920, that can be played by users, in step 924. Therefore, details of the physical golf course that is mapped can be replicated in the virtual environment. In some embodiments, the virtual environment with the virtualized physical golf course is the metaverse or any 2D, 3D, or 4D virtual environment. Therefore, using the system 600, 700, the user 604 can play the physical golf course in the virtual environment from any convenient location.

The process 900 can be used for any golf course in order to allow the user 604 to virtual play a golf course without stepping foot on the actual golf course. Therefore, famous and/or exclusive clubs may be played in the metaverse by fans or users from around the world. In some embodiments, private clubs may use the process 900 to allow prospective members an opportunity to play the course before joining it. The user 604 can then experience virtual reality golf of any physical course from the comfort of their home. The process 900 can also be used to allow the user 604 to practice playing a specific course virtually before playing it in the physical world.

Figure 10:
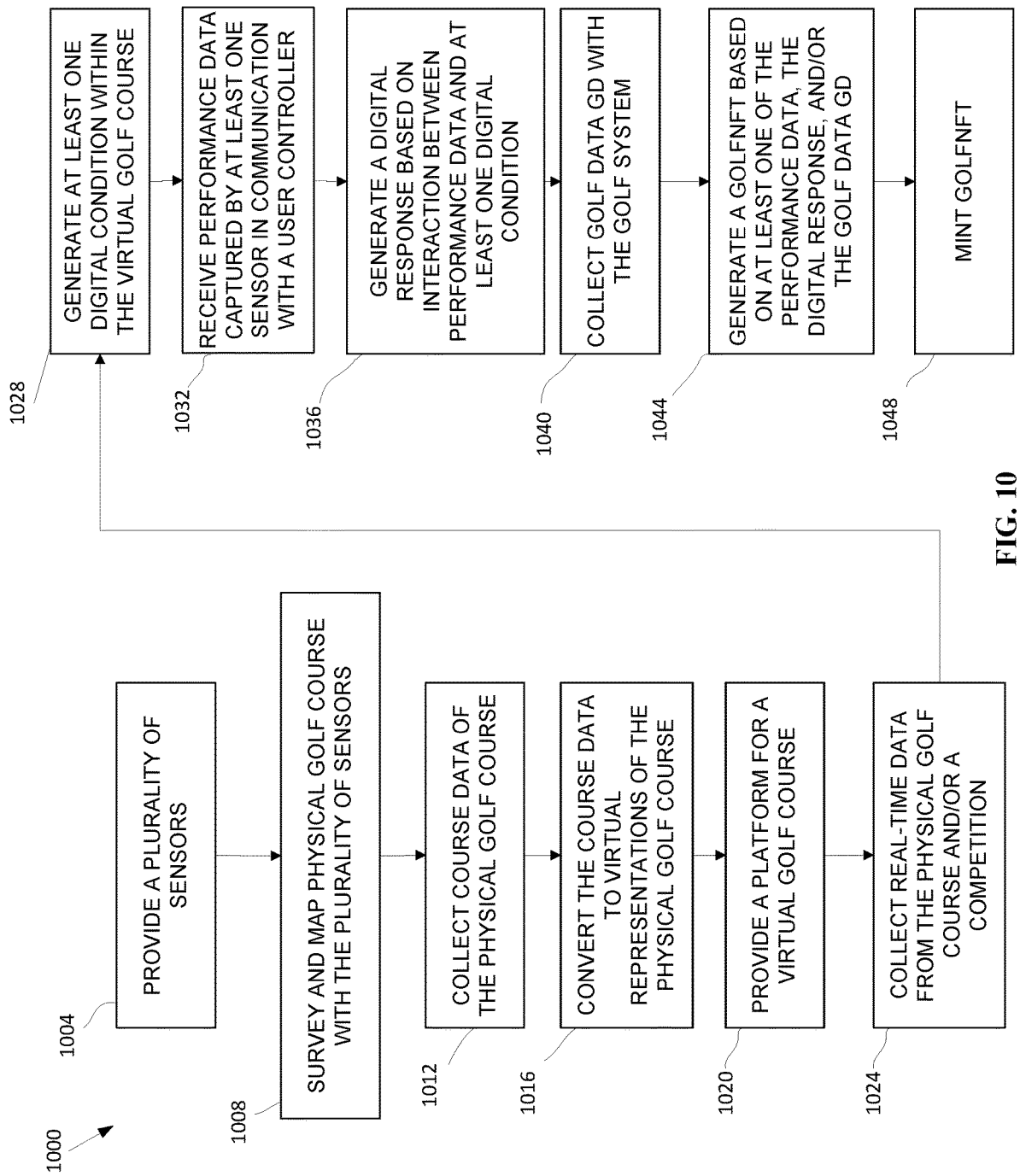
FIG. 10 depicts a flowchart for another example process of playing golf in a virtual environment.

FIG. 10 depicts a flowchart of a process 1000 for playing golf in a virtual environment, e.g., the metaverse or any 2D, 3D, or 4D virtual environment, similar to process 900 discussed above. The process 1000 can be performed in connection with the golf system 600 of FIG. 6 and/or the golf system 700 of FIG. 7. In step 1004, the process 1000 includes providing a plurality of sensors capable of surveying and mapping a physical golf course, e.g., a geo-referencing system or apparatus. In step 1008, the process 1000 also includes surveying and mapping the physical golf course with the plurality of sensors. It is contemplated that any type of sensor or mapping system can be used to survey and map the physical golf course and the topography of the physical golf course. In some embodiments, a satellite system, satellite images, drones, helicopters, airplanes, and/or vehicles may be used with the plurality of sensors to accurately map the physical golf course. In some embodiments, sensors similar to the golf sensor 724 in FIG. 7 may be used to accurately survey and map the physical golf course.

In step 1012, the process 1000 includes collecting course data of the physical golf course from the plurality of sensors. The data can be collected and used, in step 1016, to convert the course data to virtual representations of the physical golf course. Next, in step 1020, the process 1000 includes providing an online platform that is displayed on a user interface of a user device, e.g., the augmented reality device 616. The online platform presents a virtual golf course of the physical golf course in the virtual environment. In other words, steps 1016, 1020 include using the data collected from step 1012 to generate the physical golf course in the virtual environment. Therefore, details of the physical golf course can be replicated in the virtual environment. In some embodiments, the virtual environment with the virtualized physical golf course is the metaverse or any 2D, 3D, or 4D virtual environment. Therefore, using the system 600, 700, the user 604 can play the physical golf course in the virtual environment from any convenient location.

In step 1024, the process 1000 includes collecting in real-time ambient data from the physical golf course and/or a competition. For purposes of the present disclosure, data collected in real-time is made available for use as soon as it is created and acquired, with minimal lag. Next, in step 1028, the process 1000 includes generating at least one digital condition within the virtual golf course from the ambient data. Put differently, the ambient data collected from the physical golf course may be uploaded to the virtual golf course and experienced by the user 604 playing the virtual golf course in the virtual environment. In some embodiments, the ambient data may be the current weather of the physical golf course, the wind speed and direction at the physical golf course, or the time of day (sunlight) of the physical golf course. Therefore, the user 604 can experience accurate, real-time conditions of the physical golf course in the virtual environment.

Further, if a professional or amateur event is conducted on the physical golf course, the ambient data from the competition may also be collected and uploaded to the virtual environment. By way of non-limiting example, every year the Masters® is played at Augusta National® Golf Club. Before the event, the course can be surveyed, mapped, and uploaded to a virtual environment, e.g., the metaverse, similar to steps 1004, 1008, 1012, 1016, as described above. Further, the weather conditions, event seating and roping, and various other details associated with the competition on the physical golf course may also be represented in the virtual environment and updated in real-time. Therefore, the user 604 can virtually play the same course that the professionals will be playing on. Further, during the competition, the ambient data of the scores, shots, and locations of the professionals playing Augusta National® Golf Club may be collected and uploaded to the virtual golf course in order for the user 604 to watch and/or play with the professionals in the metaverse as the professionals play the physical course. As weather conditions change, e.g., wind direction or wet greens, at Augusta National® Golf Club on competition day, those same conditions may be generated in the virtual environment for any user 604 to play. Therefore, the user 604 can experience the same conditions that the professionals are also experiencing.

In step 1032, the process 1000 further includes receiving performance data captured by at least one sensor in communication with a user controller, e.g., the golf sensor 724 and/or the user controller 612, 712, preferably in real-time. Then, in step 1036, the process 1000 includes generating a digital response from the performance data that interacts with the at least one digital condition. Put differently, the user 604 may be able to swing or move the user controller 612, 712 and generate a digital response in the virtual course in the virtual environment. Thus, the user 604 can play virtual golf, using the user controller 612, 712 or the golf sensor 724, in the virtual course, while using ambient data from the physical course. For example, as described above, if the physical course is experiencing difficult playing conditions, e.g., high winds, the user 604 can also experience the exact same conditions while they attempt to play the course virtually. In some embodiments, the user 604 can change the conditions to deviate from the ambient data of the physical course.

In some embodiments, as discussed above, the user 604 can play virtual golf on the virtual course with professionals playing on the corresponding physical golf course. In particular, the user 604 may compete against the professionals during professional events and experience the same conditions as the professionals. For example, continuing with the Masters® example from above, the user 604 may compete against the professionals as they play Augusta National® Golf Club. Therefore, the user 604 can virtually join a foursome or twosome and play golf with the professionals in the virtual environment. The user 604 can watch real-time shots of the professionals in the virtual environment and try to mimic or beat the shots themselves. Instead of just watching the Masters®, the user 604 may virtually play in the event with the golf system 600 of FIG. 6 or the golf system 700 of FIG. 7.

Still referring to FIG. 10, in step 1040, Golf Data GD is collected by the golf system 600, 700 and stored with the computing device 608, as described above. The Golf Data GD can correspond to the results of the user playing virtual golf in the virtual environment. The Golf Data GD can also correspond to the ambient data that was captured from the physical golf course and/or competition/event. Accordingly, the golf system 600, 700 executes a protocol within the software platform to process the Golf Data GD received by the user controller 612, 712, as well as the data received from other sources described above with respect to the golf system 600, 700. As a result of such processing, the golf system 600, 700 may generate a report and/or display the Golf Data GD on the augmented reality device 616 for visualization and/or engagement. For example, the user 604 may view the Golf Data GD as it is collected and processed by the golf system 600, 700, and further simulations or play may be performed to generate additional Golf Data GD. Additionally, the Golf Data GD may be edited or revised or modified by manual entry of the user 604.

In step 1044, the process 1000 includes generating the GolfNFT based on and/or in association with at least one of the performance data, the digital response, and/or the Golf Data GD, in accordance with at least a portion of the method 500 described in connection with FIG. 5. In other words, the Golf NFT may be based on the interaction of the performance data captured by at least one sensor in communication with the user controller 612, 712 and the at least one digital condition from step 1028. Therefore, a unique GolfNFT may be produced that corresponds to the round or hole played by the user 604. It is contemplated that the GolfNFT may be created as a new digital asset as part of the process 1000. It is further contemplated that the GolfNFT may be selected or unlocked by the golf system 600, 700 from a reserve of pre-generated, generic GolfNFTs. The GolfNFT may also be visualized or displayed on the screen of the user device 660. In some embodiments, the GolfNFT may be embodied in the virtual golf course as a ball marker on the screen and configured to identify the location of the golf ball on the virtual golf course. In some embodiments, the GolfNFT operates as currency that the user can spend to purchase new virtual or physical golf clubs, or other virtual or physical clothing or gear, or tee times, or access to certain virtual or physical golf courses, among other goods and services.

Continuing on with the Masters® example above, once the user 604 finishes a round at Augusta National® Golf Club, the user may receive a GolfNFT associated with the round, with a hole played by the user, and/or with the score the user 604 received. In some embodiments, the ambient data collected from the physical golf course may also be incorporated into the GolfNFT. Therefore, the GolfNFT can be unique to the specific ambient data from the physical course, the results of the user 604 or the professionals playing the physical course, the course played, and/or the event taking place. Further, in some embodiments, the comparison between the score(s) of the user 604 and the score(s) of the professional golfers may also be used to generate the GolfNFT, i.e., better scores or scores closer to the professionals may result in a more specialized or unique GolfNFT being created. In some embodiments, the GolfNFT may be generated in response to some correlation between the user and the professional, such as, e.g., use of the same brand of physical golf club or virtual golf club, wearing the same brand of clothing or shoes, or the like. In some embodiments, a professional or physical golf tournament may not be associated with the process 1000 and, instead, the user may receive a GolfNFT in association with a recreational or practice round of golf played in the virtual environment.

In some embodiments, the GolfNFT may be configured in accordance with one or more parameters and/or features. For example, the royalty amount RA may be set or selected by the user 604 or automatically determined by self-executing protocol of the golf system 600, 700. In some embodiments, the user 604 is presented with a menu of pre-determined royalty amounts RA from which one can be selected. In some embodiments, the user 604 is presented with a menu for selection of a variety of configurations for the GolfNFT, including, e.g., pre-determined digital objects, pre-determined methods of generating digital objects, transfer or retention of intellectual property rights, limitations on downstream transfer, production of a collection of GolfNFTs, exclusion of portions of Golf Data GD, such as personal information, and the like.

In step 1048, the process 1000 includes minting the GolfNFT to the blockchain 670 via the computing device 608 of the golf system 600, 700. In some embodiments, the Golf NFT may be transferred to the user 604, such that the digital portfolio or wallet 680 is linked to the GolfNFT. Further, the GolfNFT can be visualized on the user device 660 of the user 604.

Figure 11:
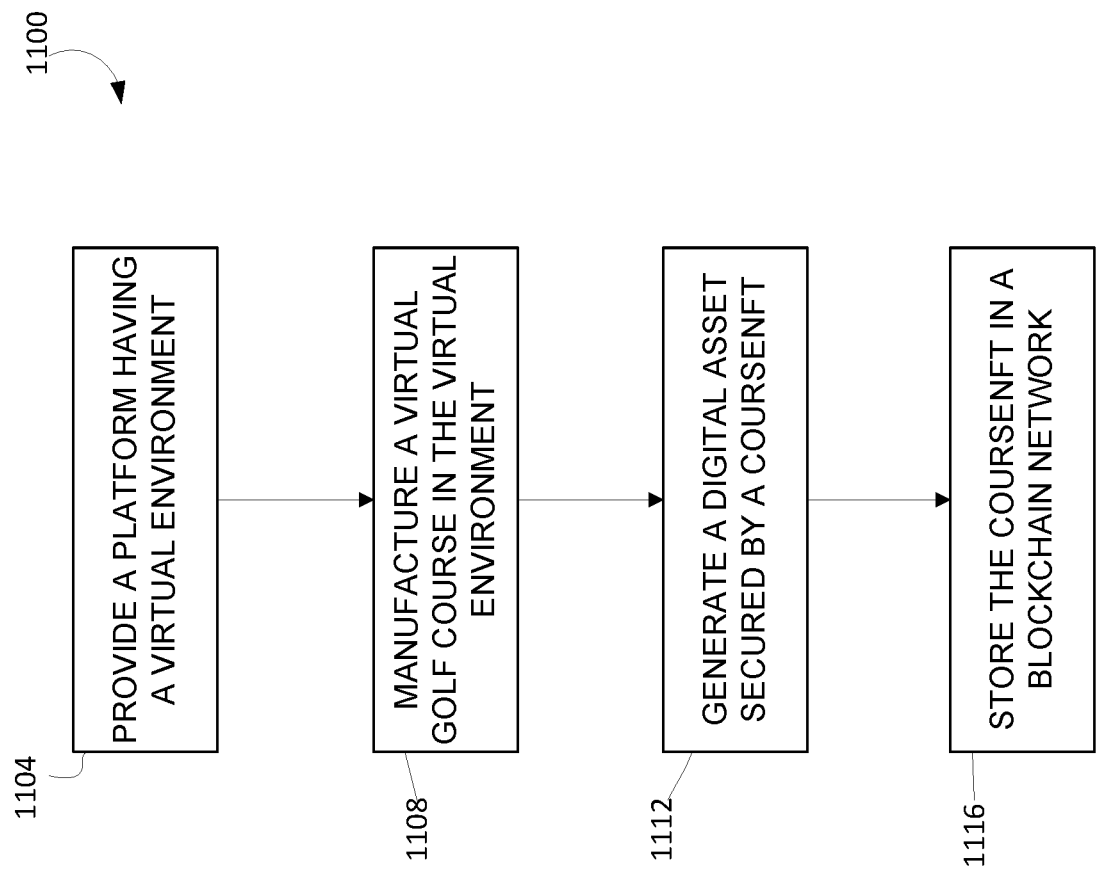
FIG. 11 depicts a flowchart for an example process of building a virtual golf course in a virtual environment.

FIG. 11 depicts a flowchart of a process 1100 for building a virtual golf course in a virtual environment in connection with the golf system 600 of FIG. 6 and/or the golf system 700 of FIG. 7. In step 1104, the process 1100 includes providing a platform having a virtual environment. The virtual environment may be displayed on a user interface of a user device, e.g., augmented reality device 616. The virtual environment may be an environment in the metaverse or any 2D, 3D, or 4D virtual environment. In step 1108, the process 1100 includes manufacturing a virtual golf course in the virtual environment. Therefore, a virtual golf course can be created in a virtual environment, e.g., the metaverse. The user 604 may be able to manufacture and build a virtual golf course through the user controller 612, 712, the augmented reality device 616, a separate controller, or another electronic device. Given the virtual nature of the virtual golf course, the user 604 can manufacture or build complex or unique courses that may not be possible in the physical world. Once the courses are built, the user 604 may play virtual golf on the virtual courses online with others or by themselves.

In step 1112, the process 1100 includes generating a digital asset authenticated by a non-fungible token. The digital asset is linked to the virtual golf course manufactured in step 1108. Therefore, the user 604 may be assigned a unique digital asset or CourseNFT associated with the manufactured golf course. In some embodiments, the CourseNFT may include features or attributes of the manufactured golf course in the virtual environment. As noted herein, the CourseNFT may be similar to or include similar features to the GolfNFT, as described above, i.e., Course Data CD, copyright protection, royalties, etc. The CourseNFT may be linked with the manufactured virtual golf course so that, if the CourseNFT is sold to another user or entity, the manufactured virtual golf course can also be transferred to the purchaser of the CourseNFT. In some embodiments, the manufactured virtual golf course can be added to the metaverse or sold to different owners in the metaverse. Finally, in step 1116, the CourseNFT can be stored (and/or minted) on a blockchain network, e.g., the blockchain network 670, similar to the GolfNFT.

Figure 12:
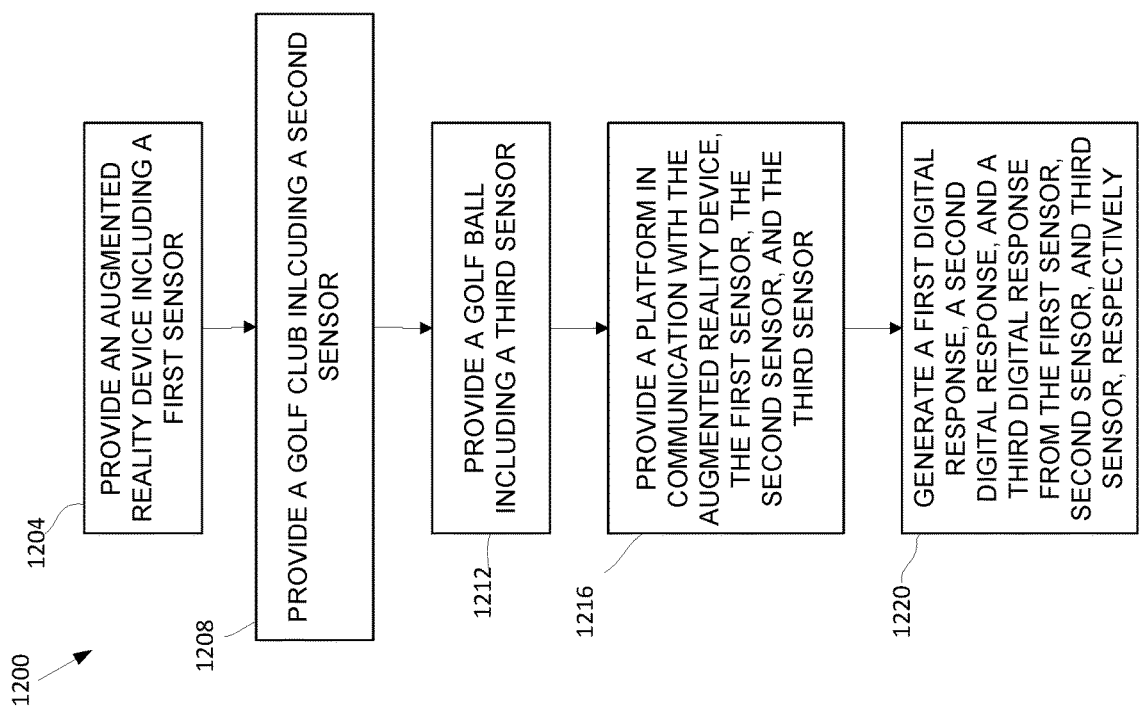
FIG. 12 depicts a flowchart for another example process of playing golf in a virtual environment.

FIG. 12 depicts a flowchart of a process 1200 for playing golf in a virtual environment, e.g., the metaverse or any 2D, 3D, or 4D virtual environment, in connection with the golf system 600 of FIG. 6 and/or the golf system 700 of FIG. 7. In step 1204, the process 1200 includes providing an augmented reality device, e.g., the augmented reality device 616, that includes a first sensor and a user interface that has a display screen. In step 1208, the process 1200 also includes providing a golf club, e.g., the user controller 612, 712, that includes a second sensor. In step 1212, the process 1200 further includes providing a golf ball, e.g., the golf ball 720, that includes a third sensor. The first sensor, second sensor, and third sensor can be any type of sensor described above with respect to the golf system 600, 700.

In step 1216, the process 1200 includes providing an online platform in communication with the augmented reality device, the first sensor, the second sensor, and the third sensor. The online platform presents a virtual golf course within the virtual environment. Finally, in step 1220, the process 1200 includes generating a first digital response, a second digital response, and a third digital response from the first sensor, the second sensor, and the third sensor, respectively. In other words, the first sensor captures a first set of data, the second sensor captures a second set of data, and the third sensor captures a third set of data. The first set of data, the second set of data, and the third set of data are communicated to the online platform where a first digital response, a second digital response, and a third digital response are generated by the respective first set of data, the second set of data, and the third set of data within the virtual golf course.

Therefore, for example, the augmented reality device 616, the user controller 612, 712, and the golf ball 720 may all be in communication with the computing device 608 to generate a response in the virtual golf course. As described above, the plurality of sensors on the augmented reality device 616, the user controller 612, 712, and the golf ball 720 may be used to accurately capture the user's swing and transform the swing into the virtual environment. In some embodiments, the process includes providing the golf sensor 724 to communicate and interact with the computing device 608, the augmented reality device 616, the user controller 612, 712, and the golf ball 720.

As noted herein, the process 1200 may allow the user 604 to play virtual golf in a virtual environment. In some embodiments, the process 1200 may be implemented in a competition or real-world professional event, similar to process 1000. Further, in some embodiments, an NFT or digital asset may be produced in response to the generated first digital response, the second digital response, and third digital response after step 1220. For example, it is contemplated that at least a portion of the first set of data, the second set of data, or the third set of data, or some combination thereof, or an entirety thereof, may be recorded or stored within metadata that is associated with a non-fungible token. It is further contemplated that data associated with the first digital response, the second digital response, or the third digital response, or some combination thereof, or an entirety thereof, may be recorded or stored within metadata that is associated with a non-fungible token. Furthermore, in some embodiments, only the augmented reality device 616 and the golf club need to be provided. In such an embodiment, the golf ball is not needed. Instead, the user 604 can just swing the user controller 612, 712 to make contact with a golf ball in the virtual environment.

Figure 13:
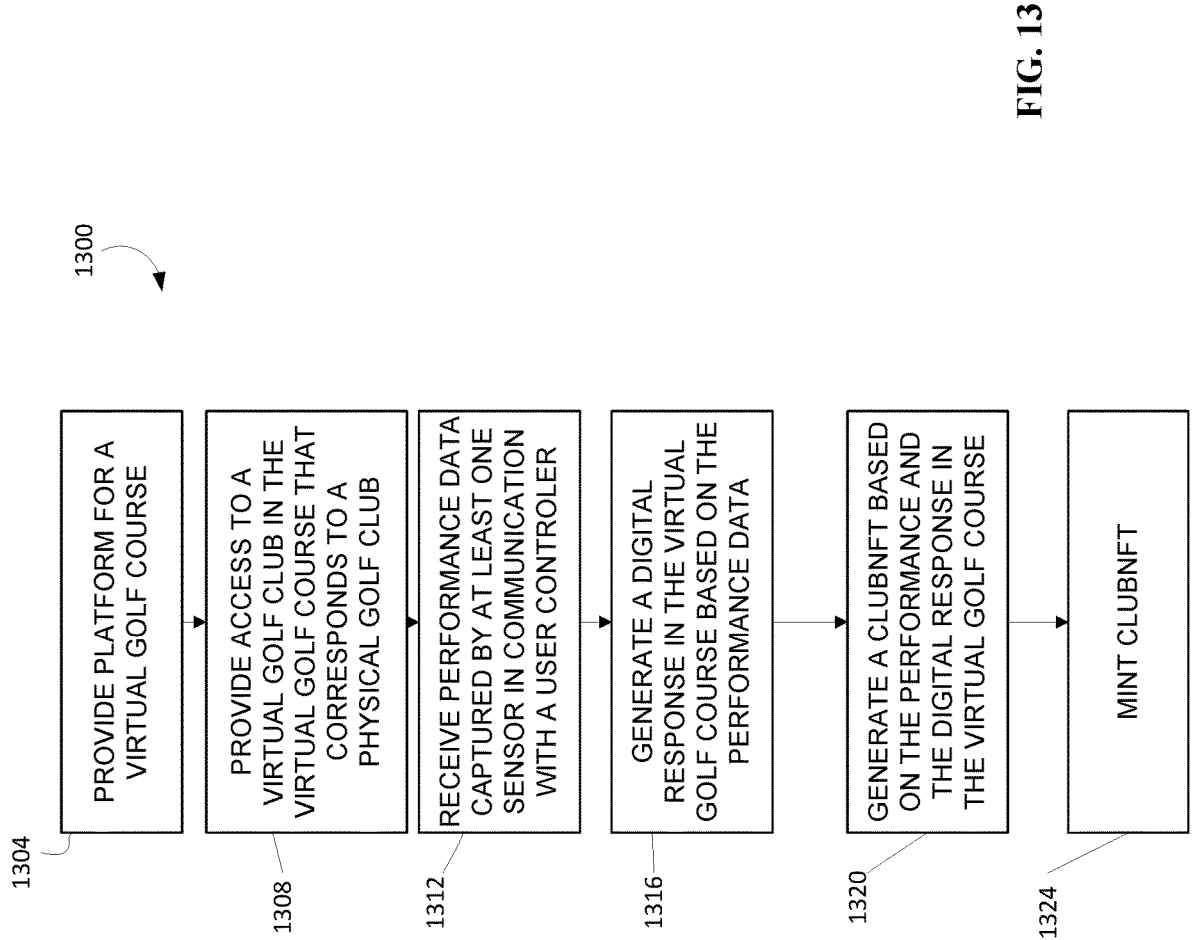
FIG. 13 depicts a flowchart for another example process of playing golf in a virtual environment.

FIG. 13 depicts a flowchart of a process 1300 for playing golf in a virtual environment, e.g., the metaverse or any 2D, 3D, or 4D virtual environment, similar to process 800. The process 1300 can be performed in connection with the golf system 600 of FIG. 6 and/or the golf system 700 of FIG. 7. In step 1304, the process 1300 includes providing a platform for a virtual golf course. As discussed above, the virtual golf course can be on the metaverse or in any 2D, 3D or 4D virtual environment. The platform can include the one or more computing devices 110 and/or the one or more servers 120. For example, the platform may be an online platform that is displayed on a user interface of the user device 110. The online platform presents a virtual golf course in the virtual environment.

In step 1308, the process 1300 includes providing access to a digital golf club in the virtual golf course that corresponds to or is associated with a physical golf club. In particular, the user 604 can use virtual golf clubs in the virtual golf course that are associated with a particular brand or model of physical golf clubs. For example, as outlined above, the virtual golf clubs may look, feel, and/or perform similar in the virtual environment as the physical clubs look, feel, and perform in the physical environment. As discussed above, the user controller 612, 712 may be associated with a physical golf club, or the user 604 may be able to purchase or obtain virtual golf clubs in the virtual environment that correspond to a physical golf club. In some embodiments, as discussed above, the user may be able to use the virtual golf club in the virtual environment after purchasing the physical golf club in the physical environment.

In step 1312, data is captured by at least one sensor in communication with the user controller 612, 712 and transferred to the computing device 608. Put differently, in step 1312, the process includes receiving performance data captured by at least one sensor in communication with the user controller 612, 712. The computing device 608 can then, in step 1316, generate a digital response in the virtual golf course based on the performance data captured by at least one sensor in communication with the user controller. For example, through the various sensors 230 in the user controller 612, 712, the swing characteristics of a swing by the user 604 can be determined. These swing characteristics can be transferred and uploaded to the virtual environment and generate a response. Therefore, the user can play a round of golf in the virtual golf course with the virtual golf club that corresponds to a physical golf club.

In step 1320, the process 1300 includes generating a ClubNFT based on the performance data captured by at least one sensor in communication with the user controller 612, 712 and the digital response in the virtual golf course. In other words, the ClubNFT may be based on the performance data captured by at least one sensor in communication with the user controller 612, 712, the response generated in step 1316, the virtual golf course, and/or the type of virtual club used. Therefore, a unique ClubNFT may be produced that corresponds to the virtual golf club used, the round played by the user, the score of the user in the virtual golf course, and/or a specific shot made by the user in the virtual golf course. As noted herein, the ClubNFT may be similar to or include similar features as the GolfNFT and CourseNFT, as described above, i.e., Club Data CD, copyright protection, royalties, etc. Finally, in step 1324, the process 1300 includes minting the ClubNFT to the blockchain 670 via the computing device 608 of the golf system 600, 700. In some embodiments, the ClubNFT may be transferred to the user 604, such that the digital portfolio or wallet 680 is linked to the ClubNFT. Further, the ClubNFT can be visualized on the user device 660 of the user 604.

As outlined above, the process 1300 includes providing the user with access to a virtual golf club in the virtual environment and generating a ClubNFT based on the user's results/responses in the virtual environment. In one non-limiting example, a user may play a round of virtual golf with a set of virtual golf clubs that correspond to physical golf clubs. Depending on the score of the round and/or the amount of times using a specific virtual golf club that is linked to a physical golf club in that round, a unique ClubNFT may be produced and awarded to the user. The ClubNFT can be associated with the virtual golf clubs that correspond to the physical golf clubs. In some embodiments, a two-dimensional or three-dimensional image of the digital asset associated with the ClubNFT may look like one of the virtual golf clubs used in the round. In some embodiments, the ClubNFT can provide prestige, such as, e.g., by representing an accomplishment or accolade that is displayed or represented on a user's profile, e.g., a social media profile or a digital community profile or platform-specific profile. The ClubNFT may provide other functionalities, such as, e.g., unlocking access for the user to attend events in the virtual environment or in the physical environment. For example, the ClubNFT may operate similarly to a ticket, or a special permit or pass, to provide the user with access to an exclusive golf event or tournament, whether in the virtual environment or in the physical environment. In one non-limiting example, the event may be a club fitting or demo event put on by the brand of the virtual golf club. Further, in some embodiments, the ClubNFT may provide the user with pricing discounts on physical golf clubs in the virtual environment. For example, if the user uses a particular virtual golf club in the virtual environment that corresponds to a certain physical golf club, the user may receive a ClubNFT that allows the user to receive a pricing discount on the next generation of that physical golf club at the time or before it is publicly available. Alternatively, a user may be able to play with a virtual golf club in the virtual environment that corresponds to a physical golf club and get a ClubNFT that provides the user with a discount to buy the actual physical golf club. Furthermore, in some embodiments, once the user unlocks, opens, and/or obtains access to the virtual golf club that corresponds to the physical golf club, a ClubNFT may be produced and/or awarded to the user.

As discussed above, in some embodiments, the user may be awarded a ClubNFT based on a shot in the virtual environment. For example, if the user achieves a hole-in-one, a ClubNFT may be produced based on the virtual club used to achieve the hole in one. In some embodiments, a user may be able to play with a virtual golf club that corresponds to a physical golf club that a professional golfer plays with. During the round or once the round is over, the user may be provided with a ClubNFT that corresponds to the professional golfer or the physical golf club of the professional golfer. In one-non-limiting example, depending on the rarity or uniqueness of the ClubNFT issued to the user, the user may be able to meet with the professional golfer or get access to special products from the professional golfer or the brand associated with the professional golfer.

In some embodiments, any suitable computer readable media can be used for storing instructions for performing the functions and/or processes described herein. For example, in some embodiments, computer readable media can be non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media.

As noted herein, any of the process 800, 900, 1000, 1100, 1200, 1300 described herein may be used with any of the systems 600, 700 described herein. Further, in some embodiments, the process 800, 900, 1000, 1100, 1200, 1300 may include more or less steps than outlined in FIGS. 8-13. The above-described aspects of the processes of FIGS. 5 and 8-13 can be executed or performed in any order or sequence not limited to the order and sequence shown and described in the figures. Also, some of the above aspects of the processes of FIGS. 5 and 8-13 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method of playing golf in a virtual environment, the method comprising:
   providing an online platform that is displayed on a user interface of a user device, wherein the online platform presents a virtual golf course in the virtual environment;
   providing access to a virtual golf club in the virtual golf course that corresponds to a physical golf club using a code that is provided upon purchase of the physical golf club, wherein the virtual golf club has substantially the same metrics as the corresponding physical golf club;

receiving performance data captured by at least one sensor in communication with a user controller;

generating a digital response in the virtual golf course based on the performance data;

generating a non-fungible token associated with metadata and a digital object based on the performance data; and minting the non-fungible token to a blockchain network.

2. The method of claim 1, wherein the virtual golf course is a 3D virtual golf course.

* * * * *